US008932781B2

(12) United States Patent
Yang et al.

(10) Patent No.: US 8,932,781 B2
(45) Date of Patent: Jan. 13, 2015

(54) CHEMICAL COMPOSITIONS, METHODS OF MAKING THE CHEMICAL COMPOSITIONS, AND STRUCTURES MADE FROM THE CHEMICAL COMPOSITIONS

(75) Inventors: Lei Yang, Atlanta, GA (US); Zhe Cheng, Wilmington, DE (US); Ze Liu, Atlanta, GA (US); Meilin Liu, Alpharetta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 824 days.

(21) Appl. No.: 12/609,179

(22) Filed: Oct. 30, 2009

(65) Prior Publication Data

US 2010/0112408 A1 May 6, 2010

Related U.S. Application Data

(60) Provisional application No. 61/218,584, filed on Jun. 19, 2009, provisional application No. 61/109,522, filed on Oct. 30, 2008.

(51) Int. Cl.
*H01M 8/10* (2006.01)
*H01B 1/02* (2006.01)
(Continued)

(52) U.S. Cl.
CPC *H01B 1/12* (2013.01); *C04B 35/50* (2013.01); *C04B 2235/3215* (2013.01); *C04B 2235/3229* (2013.01); *C04B 2235/3244* (2013.01); *C01P 2002/72* (2013.01); *H01M 4/9008* (2013.01); *Y02E 60/525* (2013.01); *C01P 2002/34* (2013.01); *C04B 35/6262* (2013.01); *C01G 53/006* (2013.01); *H01M 2008/1293* (2013.01); *C04B 2235/3224* (2013.01); *H01M 8/1246* (2013.01); *C04B 2235/3201* (2013.01); *C01P 2002/88* (2013.01); *Y02E 60/522* (2013.01); *H01M 4/9033* (2013.01); *C01G 25/006* (2013.01); *C01P 2002/82* (2013.01); *C04B 2235/3225* (2013.01); *C01P 2006/40* (2013.01); *C01P 2002/52* (2013.01); *C01P 2002/85* (2013.01)
USPC ........... 429/486; 252/519.1; 252/519.15

(58) Field of Classification Search
CPC ........................................... H01M 4/8657
USPC ........................................ 429/33, 486
See application file for complete search history.

(56) References Cited

U.S. PATENT DOCUMENTS

4,950,562 A * 8/1990 Yoshida et al. ............... 429/457
5,190,834 A * 3/1993 Kendall ........................ 429/466
(Continued)

FOREIGN PATENT DOCUMENTS

WO 2008/048225 A2 4/2008

OTHER PUBLICATIONS

Gorte, et al., Characterization of Sr-Doped LaCoO3-YSZ Composites Prepared by Impregnation Methods, J. Electrochem. Soc. 151 (10) A1592-A1597 (2004).*

(Continued)

*Primary Examiner* — Ula C. Ruddock
*Assistant Examiner* — Lisa S Park Gehrke
(74) *Attorney, Agent, or Firm* — Thomas | Horstemeyer, LLP

(57) ABSTRACT

Embodiments of the present disclosure include chemical compositions, structures, anodes, cathodes, electrolytes for solid oxide fuel cells, solid oxide fuel cells, fuel cells, fuel cell membranes, separation membranes, catalytic membranes, sensors, coatings for electrolytes, electrodes, membranes, and catalysts, and the like, are disclosed.

3 Claims, 20 Drawing Sheets

(51) Int. Cl.
*C04B 35/50* (2006.01)
*H01M 4/90* (2006.01)
*C04B 35/626* (2006.01)
*C01G 53/00* (2006.01)
*H01B 1/12* (2006.01)
*C01G 25/00* (2006.01)
*H01M 8/12* (2006.01)

(56) References Cited

U.S. PATENT DOCUMENTS

| | | | | |
|---|---|---|---|---|
| 5,240,903 | A | * | 8/1993 | Shimoyama et al. ......... 505/125 |
| 5,656,387 | A | * | 8/1997 | Barnett et al. ................ 429/482 |
| 5,911,860 | A | * | 6/1999 | Chen et al. .................... 204/295 |
| 6,004,696 | A | * | 12/1999 | Barnett et al. ................ 429/219 |
| 7,033,637 | B1 | * | 4/2006 | Hunt et al. ...................... 427/77 |
| 7,300,718 | B2 | * | 11/2007 | Yamada et al. ............... 429/480 |
| 2002/0177031 | A1 | * | 11/2002 | Doshi et al. ..................... 429/44 |
| 2004/0129135 | A1 | * | 7/2004 | Roark et al. ....................... 95/55 |
| 2006/0131182 | A1 | * | 6/2006 | Mazanec et al. ............. 205/551 |
| 2006/0134347 | A1 | | 6/2006 | Chiruvolu et al. |
| 2006/0157674 | A1 | * | 7/2006 | Matsumoto et al. .......... 252/500 |
| 2008/0230779 | A1 | | 9/2008 | Goyal |
| 2009/0197135 | A1 | * | 8/2009 | Querel et al. ................... 429/30 |
| 2011/0084237 | A1 | * | 4/2011 | Wachsman et al. .......... 252/373 |

OTHER PUBLICATIONS

Virkar et al., Transport Properties of Potassium-Doped BaZrO3 in Oxygen- and Water-Vapor-Containing Atmospheres, J. Electrochem. Soc. 153 (7) A1397-A1405 (2006).*

Nunez, et al., Performance of ZSCoF (X=Ba, La and Sm) and LSCrX' (X'=Me, Fe, and Al) perovskite-structure materials on LSGM electrolyte for IT-SOFC, Electrochemica Acta, 52, 2950-2958 (2007).*

Vlachos, et al., Development and Characterization of an Ultrathin Barium Oxide Film on a Surface Oxidized Ni(110) Substrate, Synthesis and Reactivity in Inorganic, Metal-Organic, and Nano-Metal Chemistry 38, 400-404 (2008).*

English machine translation of Wurzeil et al. WO9815961, Apr. 1998.*

International Search Report and Written Opinion for PCT/US2009/062747. Dec. 31, 2009.

* cited by examiner

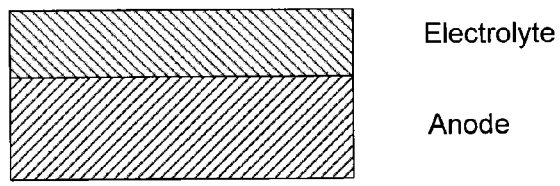
Electrolyte
Anode
FIG. 1.1A
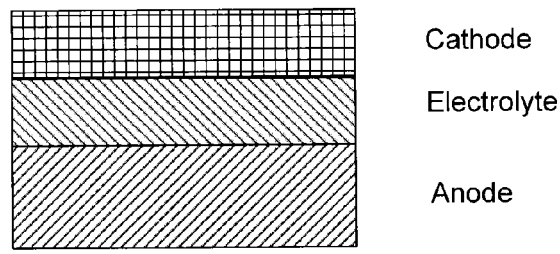
Cathode
Electrolyte
Anode
FIG. 1.1B
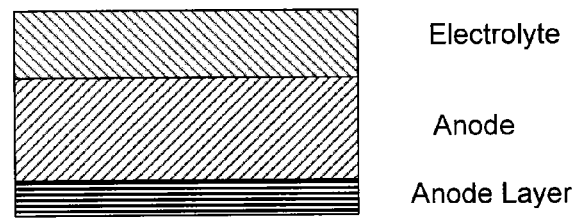
Electrolyte
Anode
Anode Layer
FIG. 1.1C
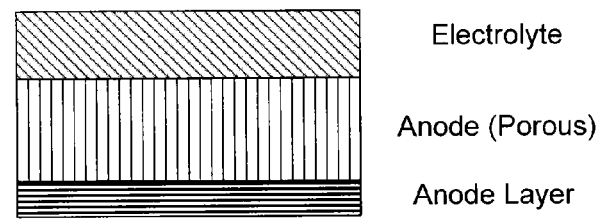
Electrolyte
Anode (Porous)
Anode Layer
FIG. 1.1D

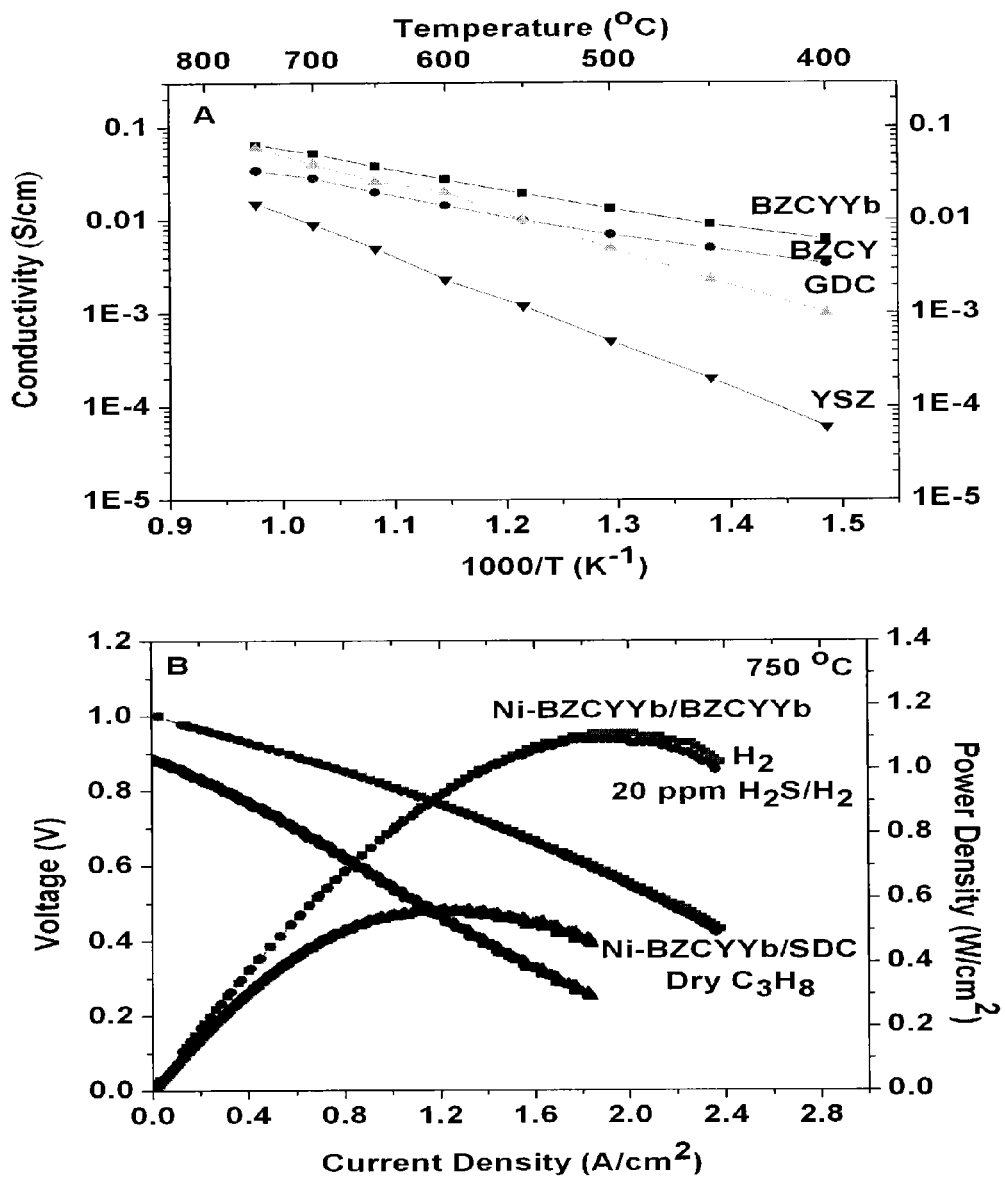
FIGS. 2.1A and 2.1B

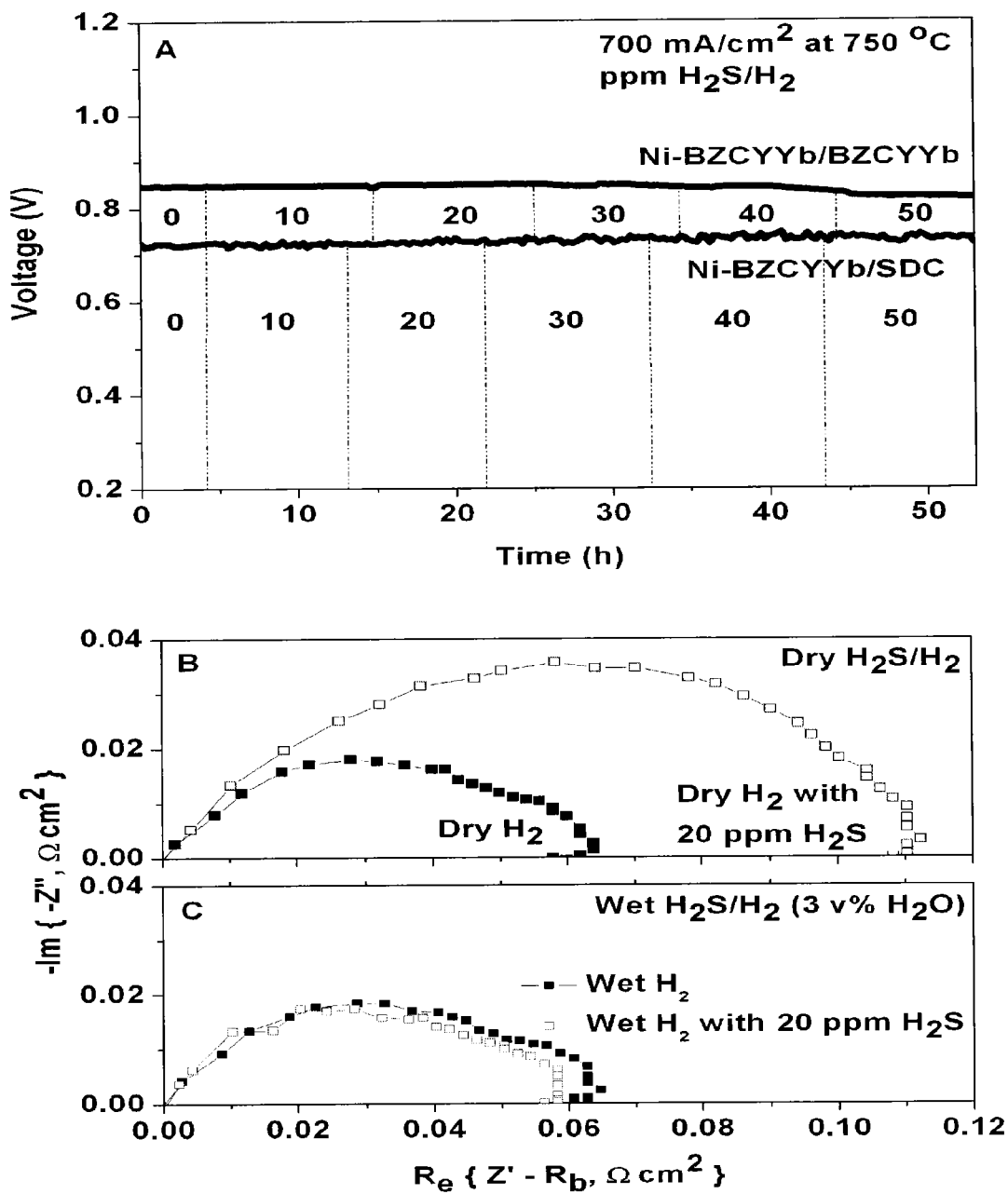
FIGS. 2.2A to 2.2C

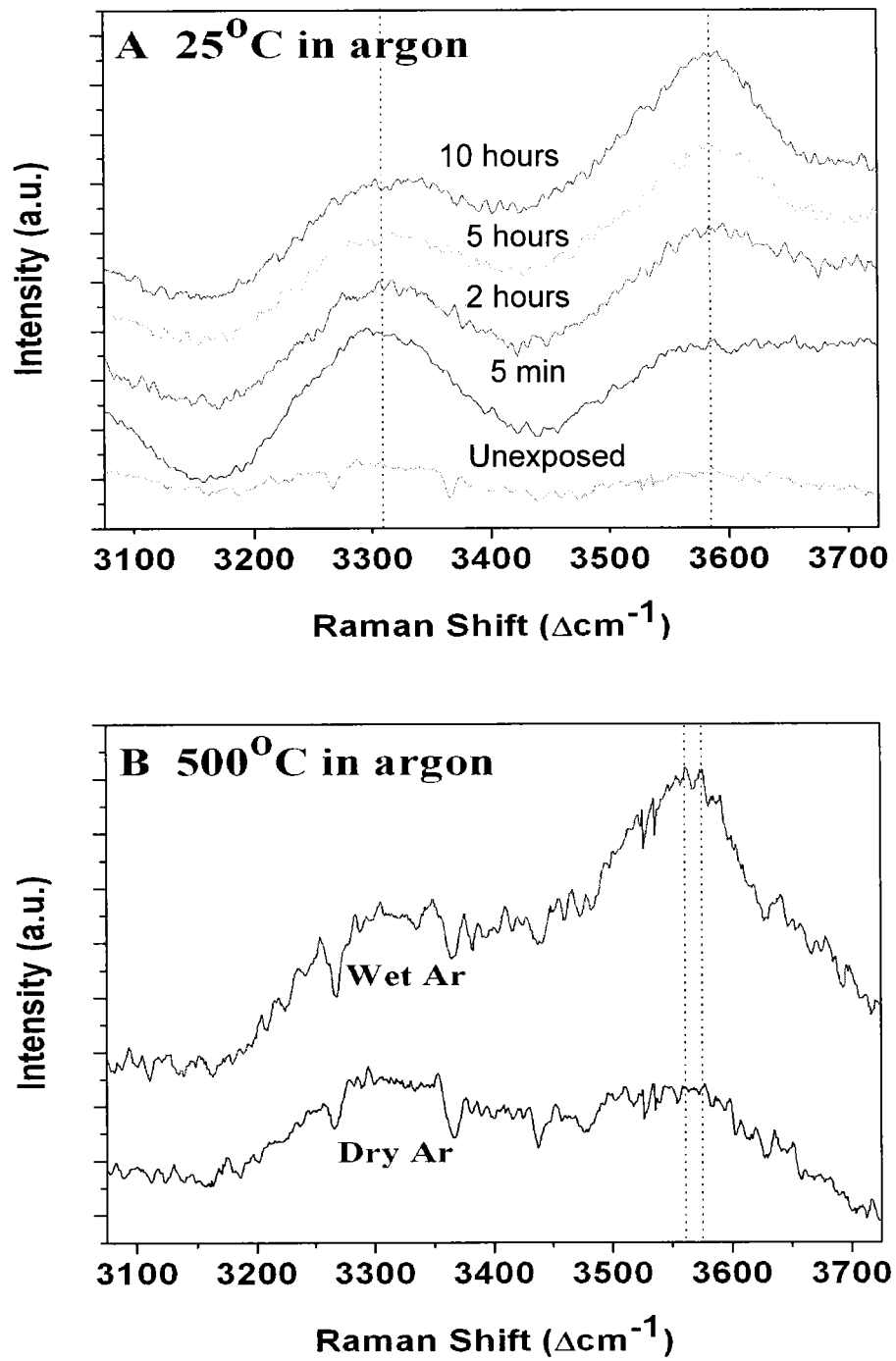
FIGS. 2.3A to 2.3B

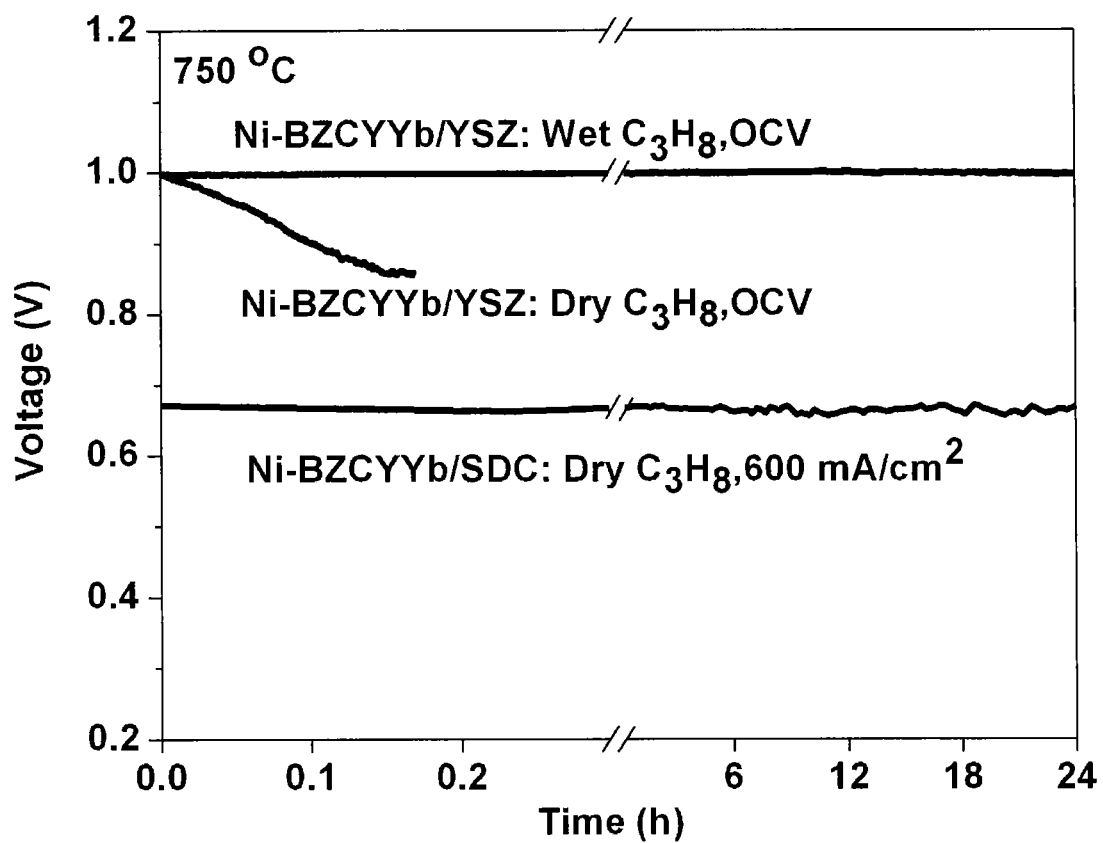
FIG. 2.4

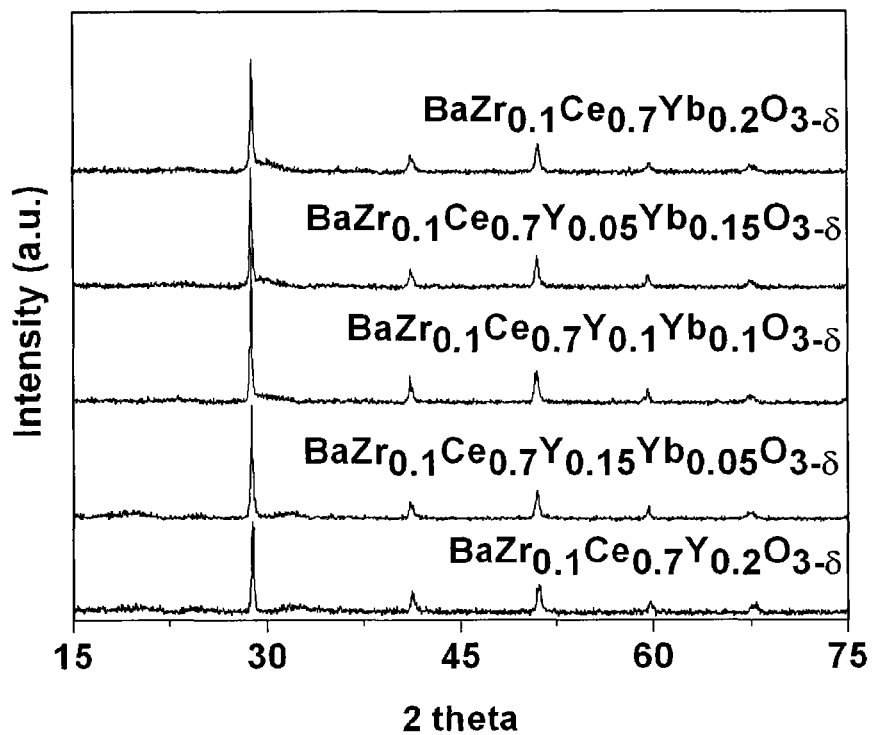
FIG. 2.5
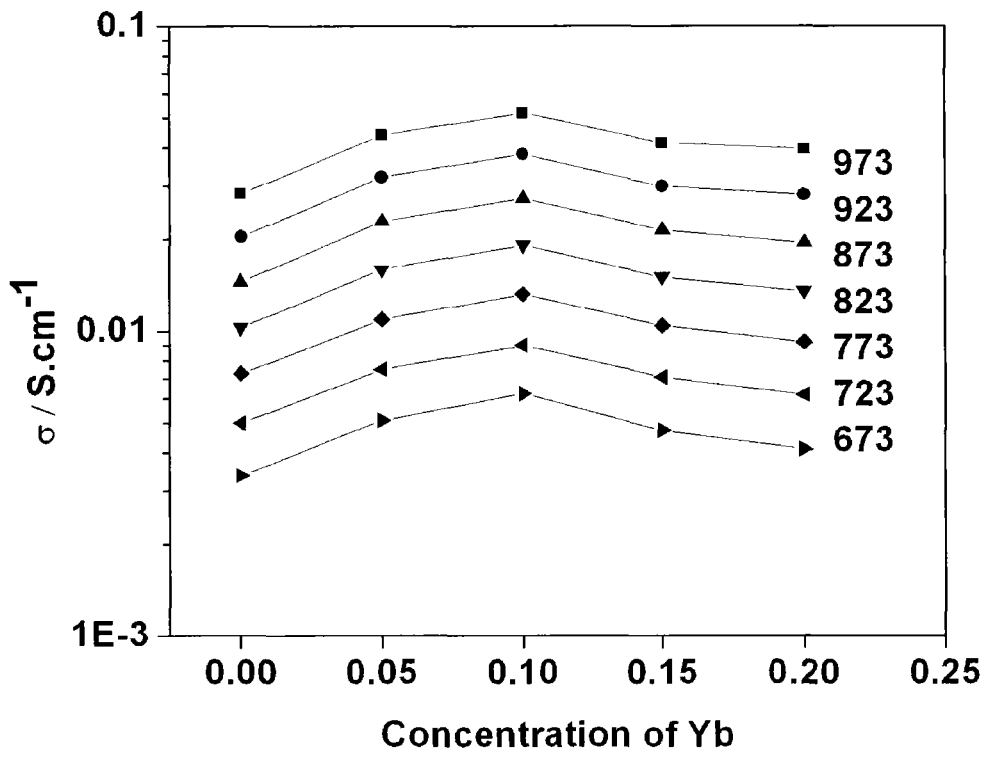
FIG. 2.6

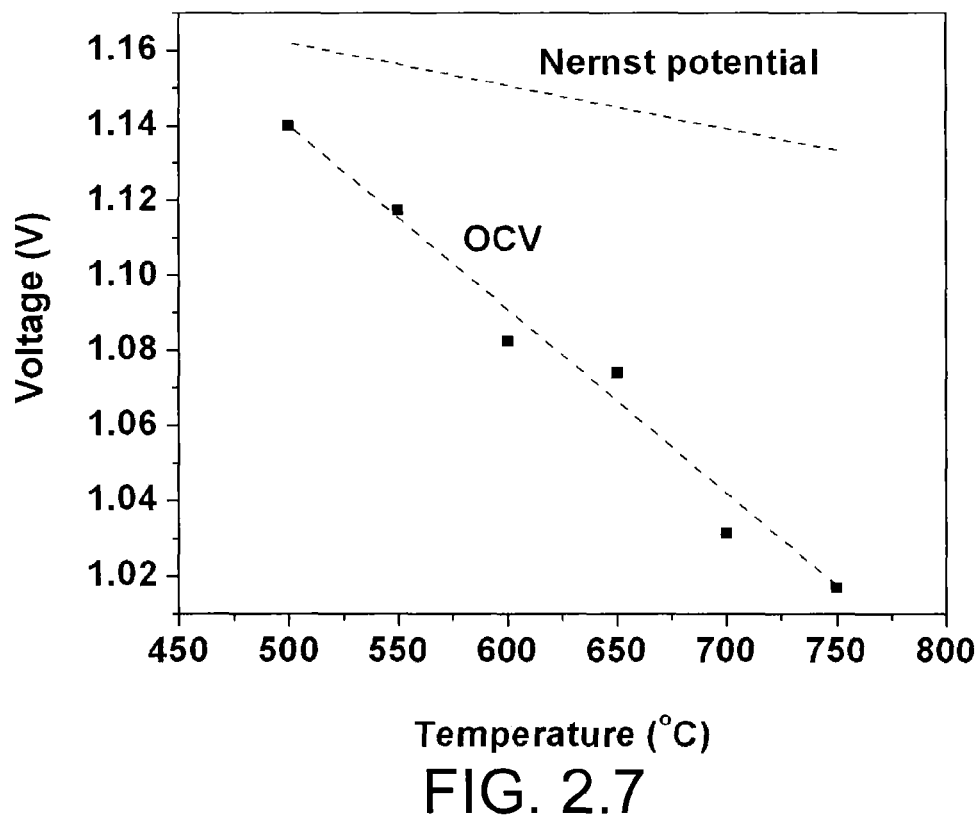
FIG. 2.7
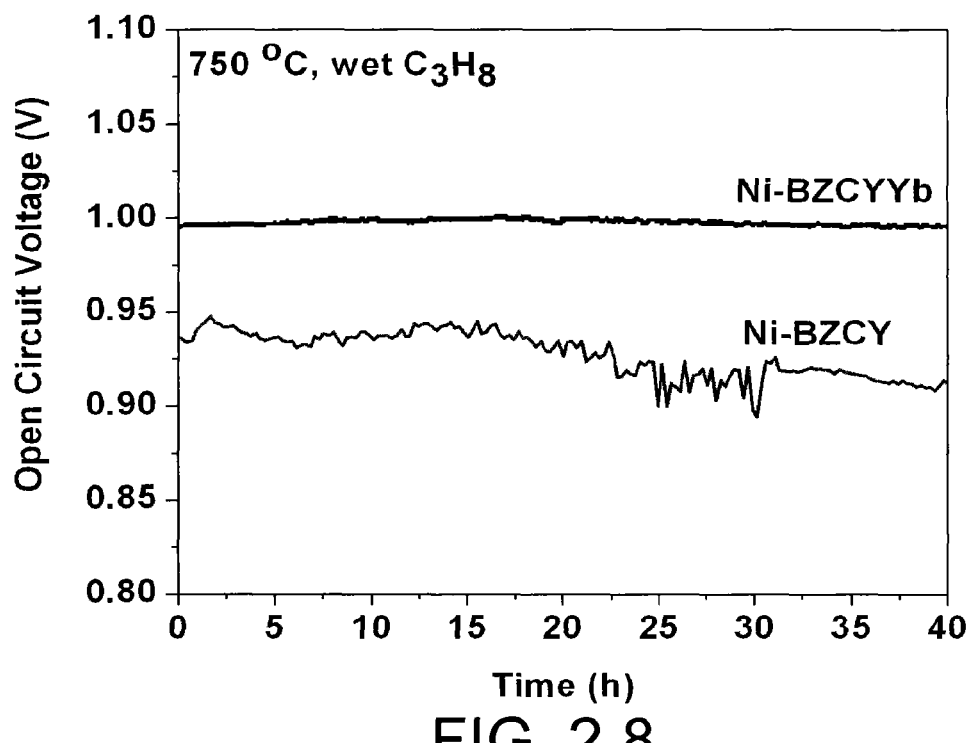
FIG. 2.8

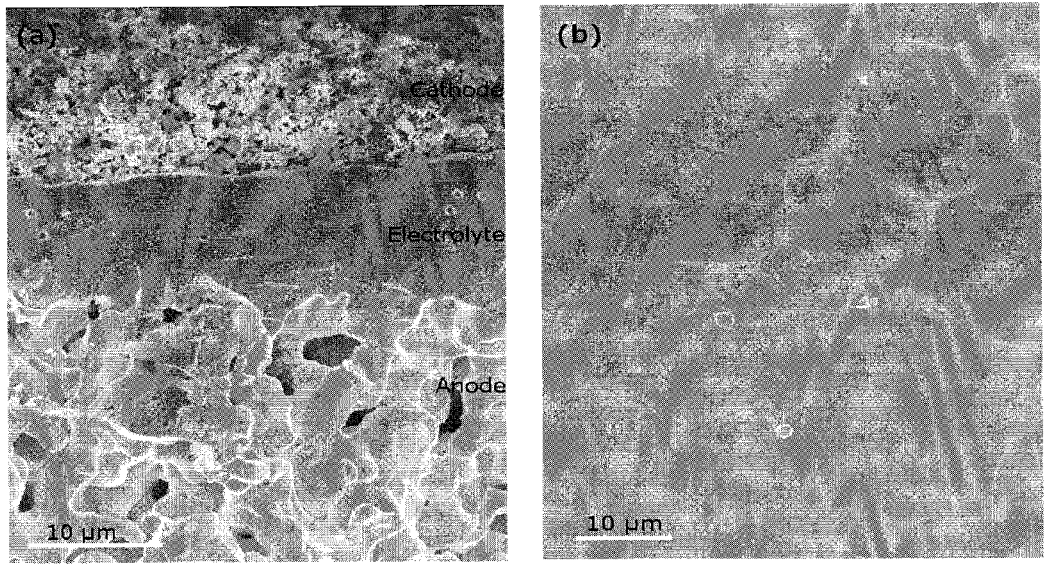
FIG. 2.9
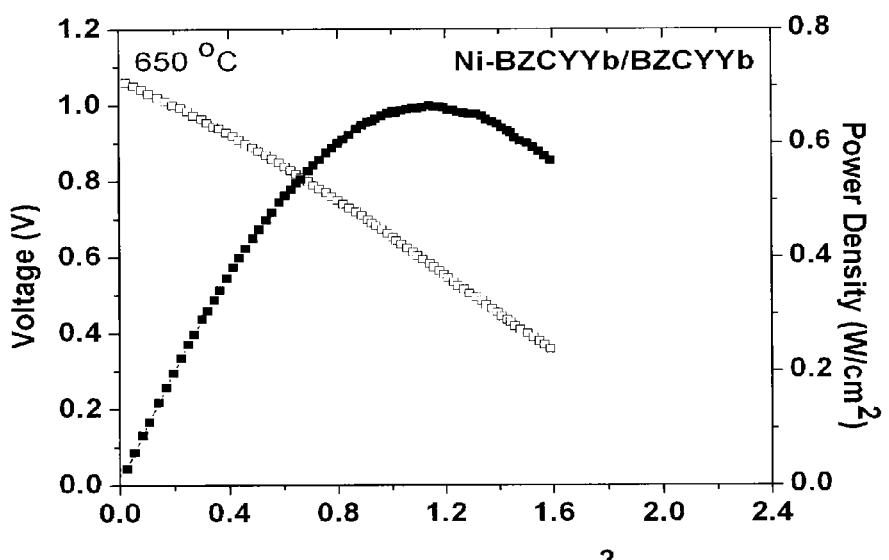
FIG. 2.10

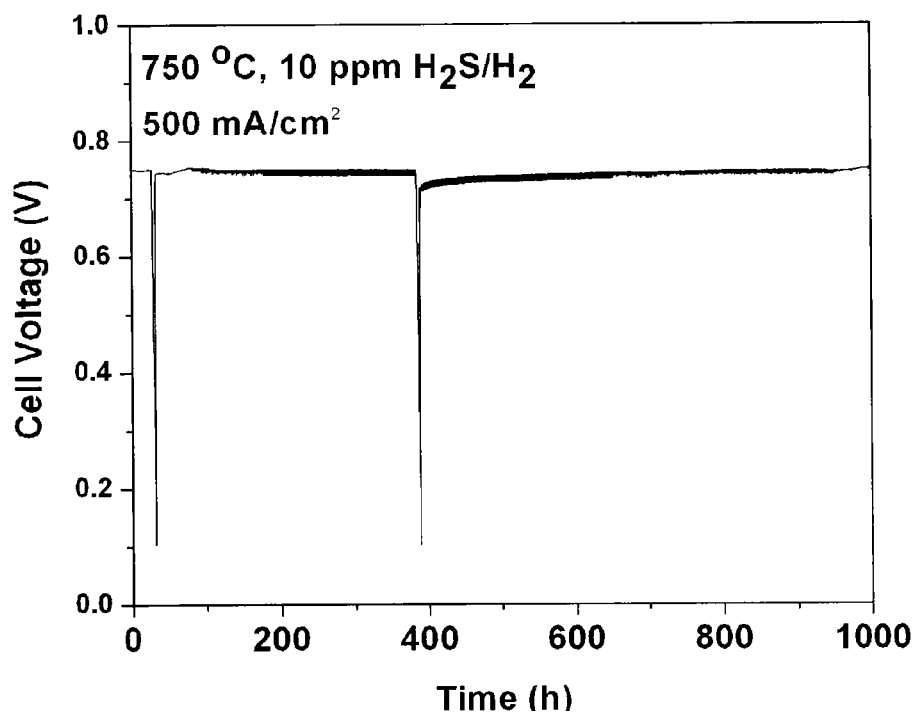
FIG. 2.11
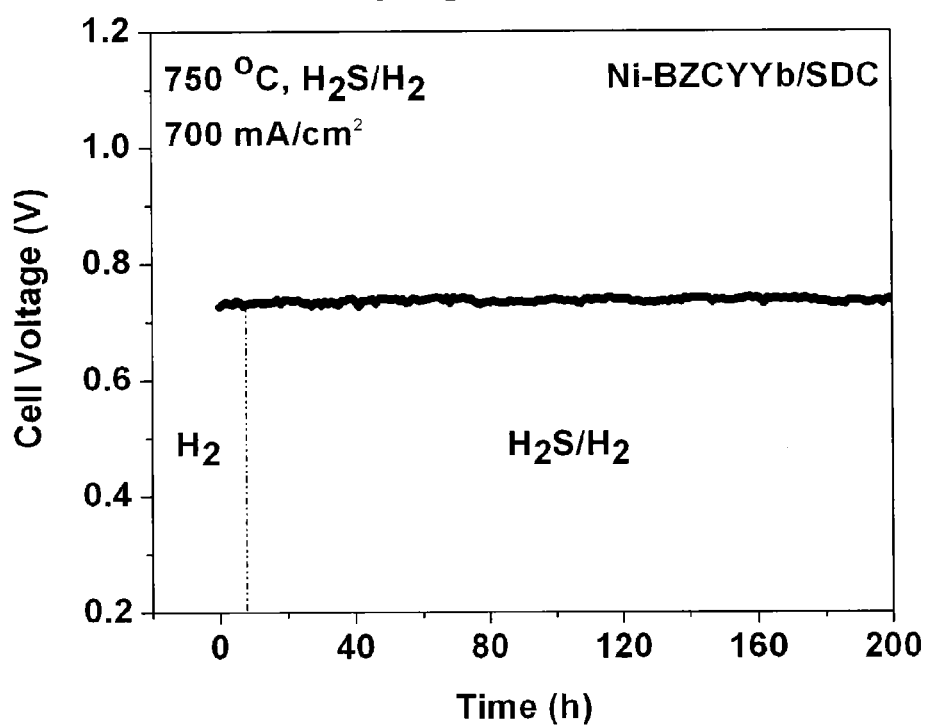
FIG. 2.12

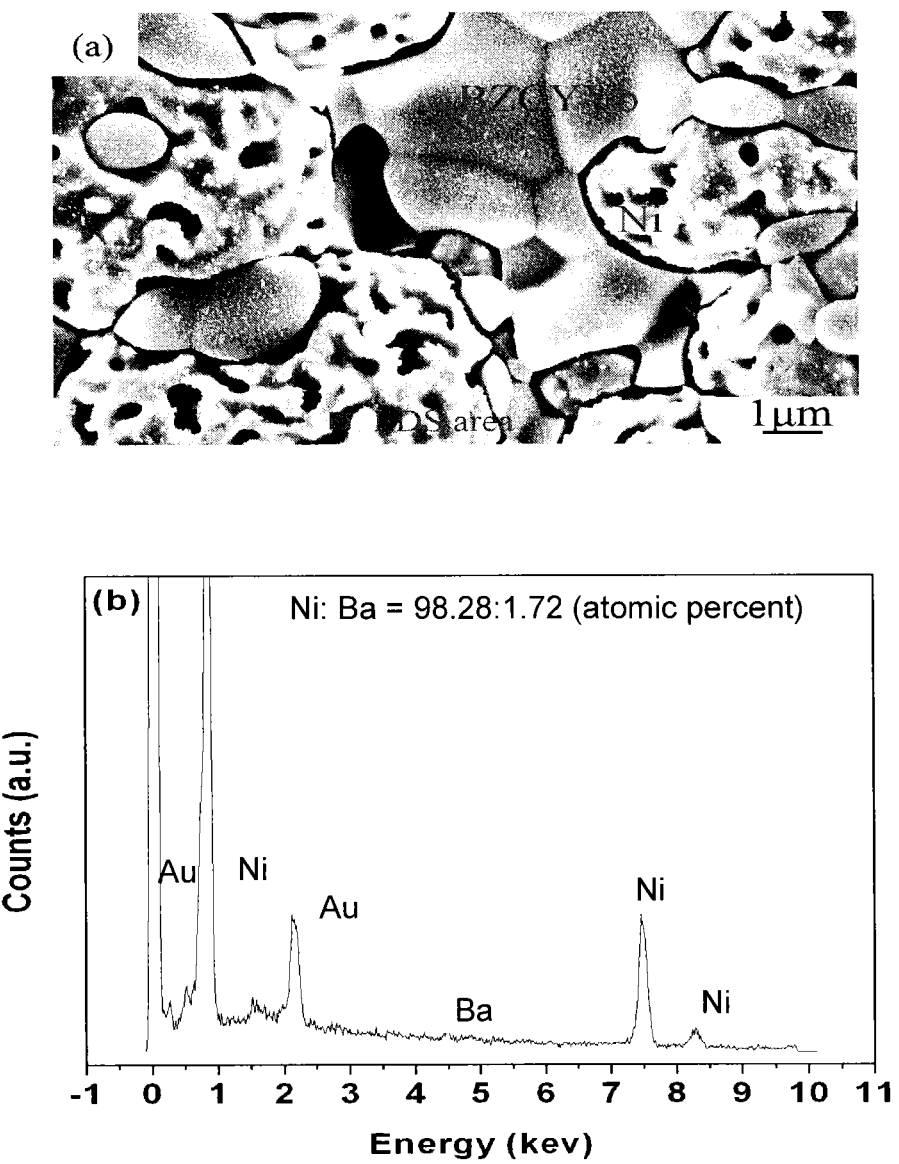
FIG. 2.13A and 2.13B

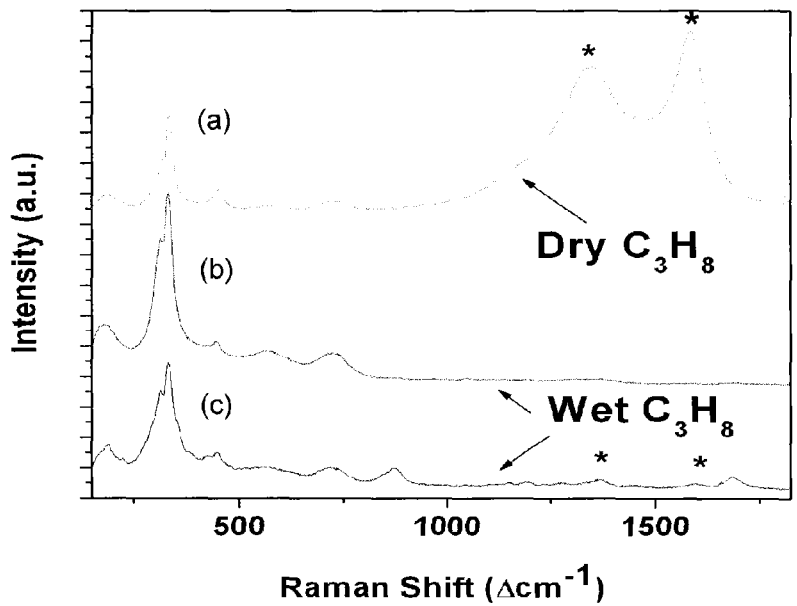
FIG. 2.14
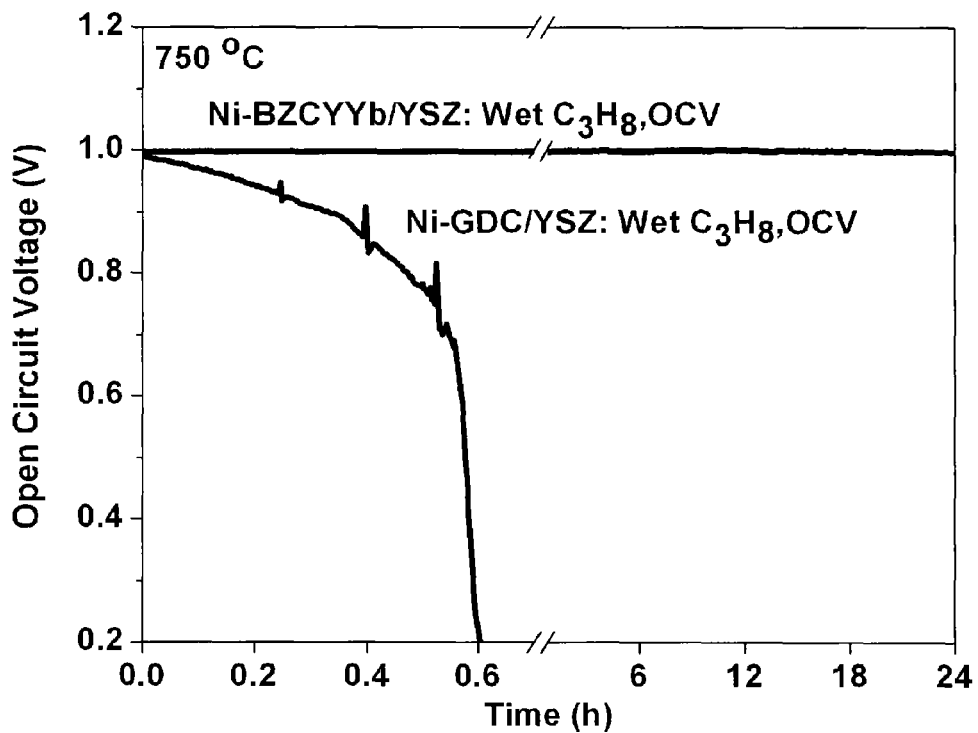
FIG. 2.15

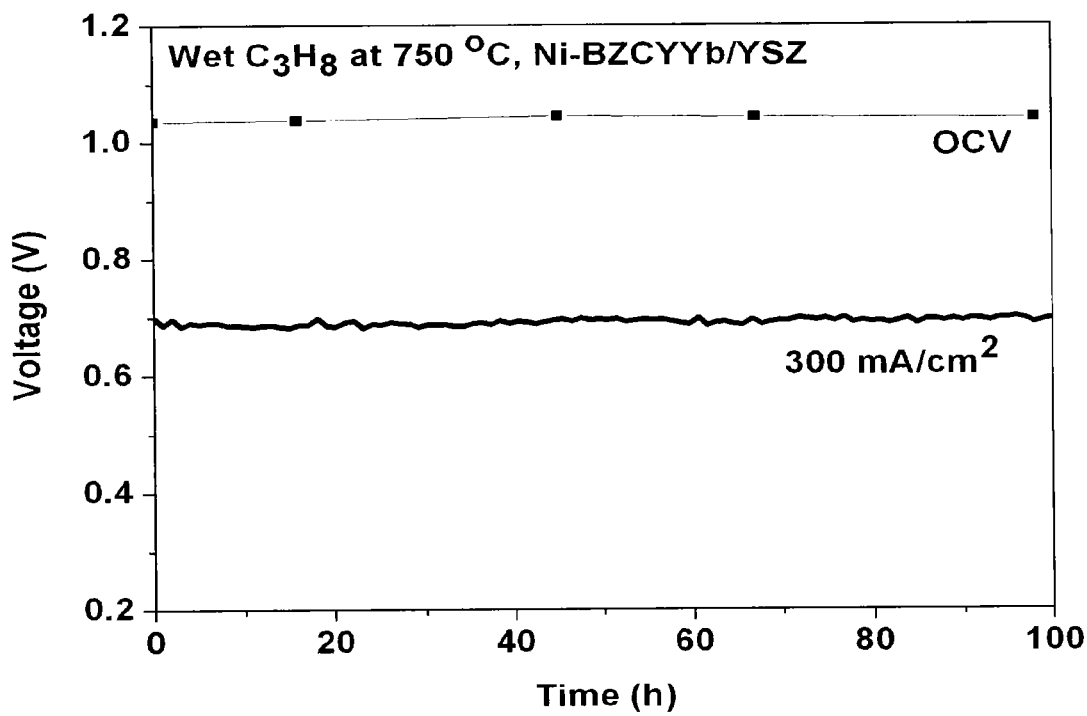
FIG. 2.16
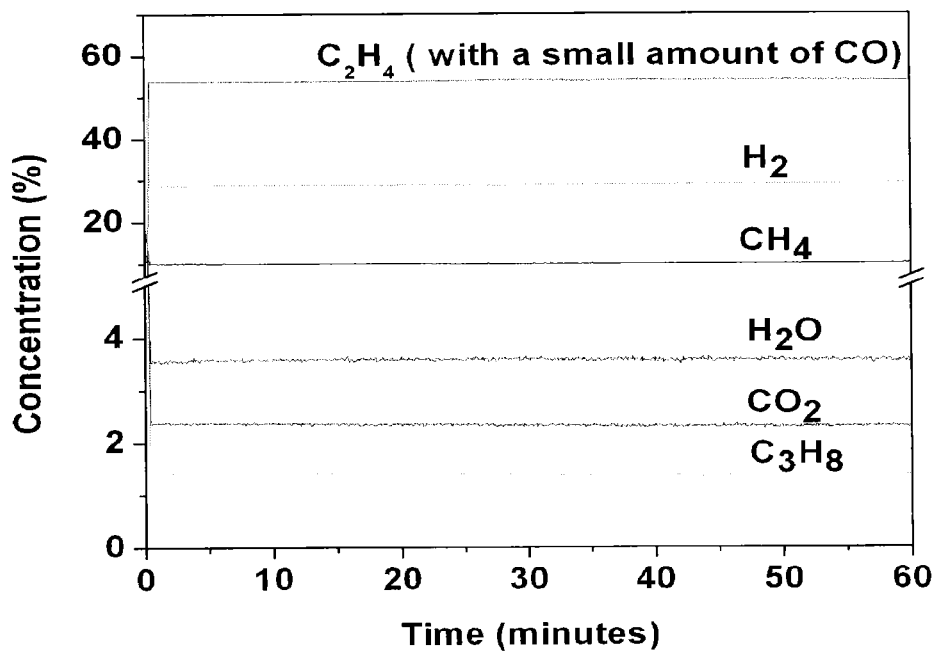
FIG. 2.17

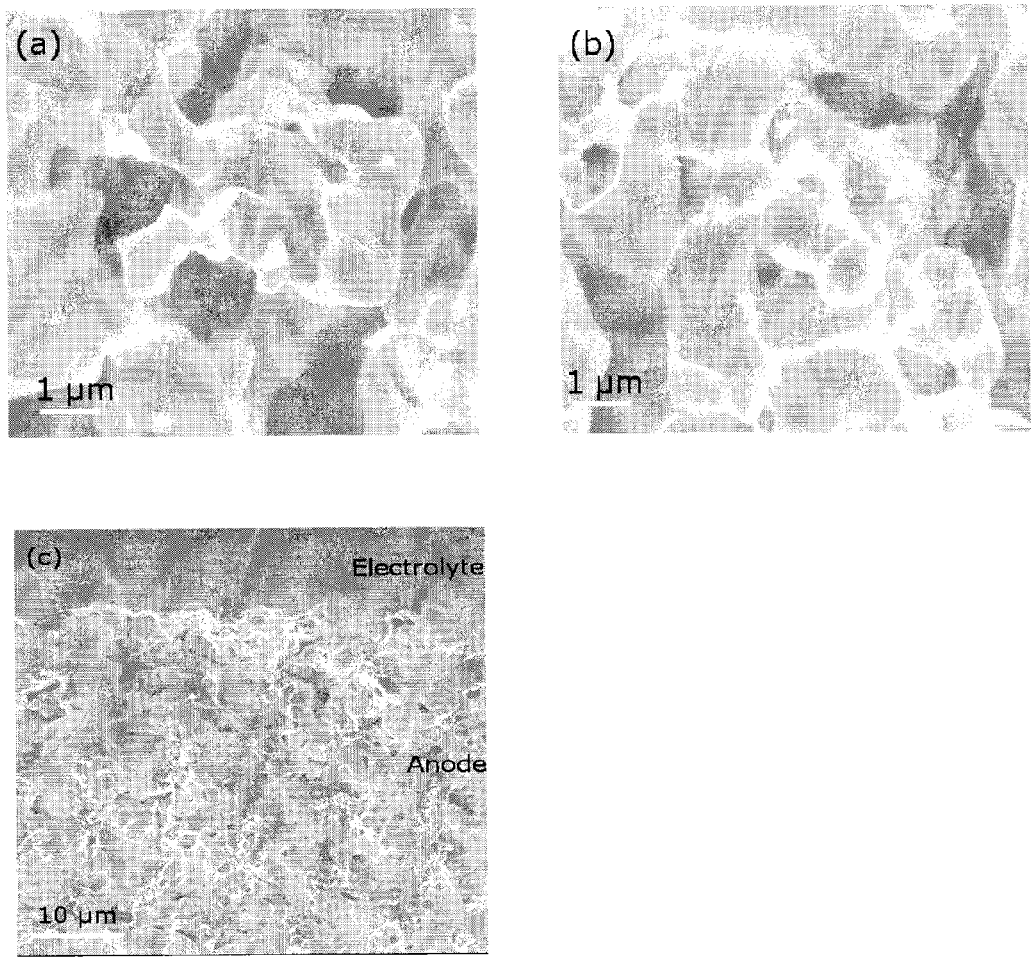
FIG. 2.18A to 2.18C

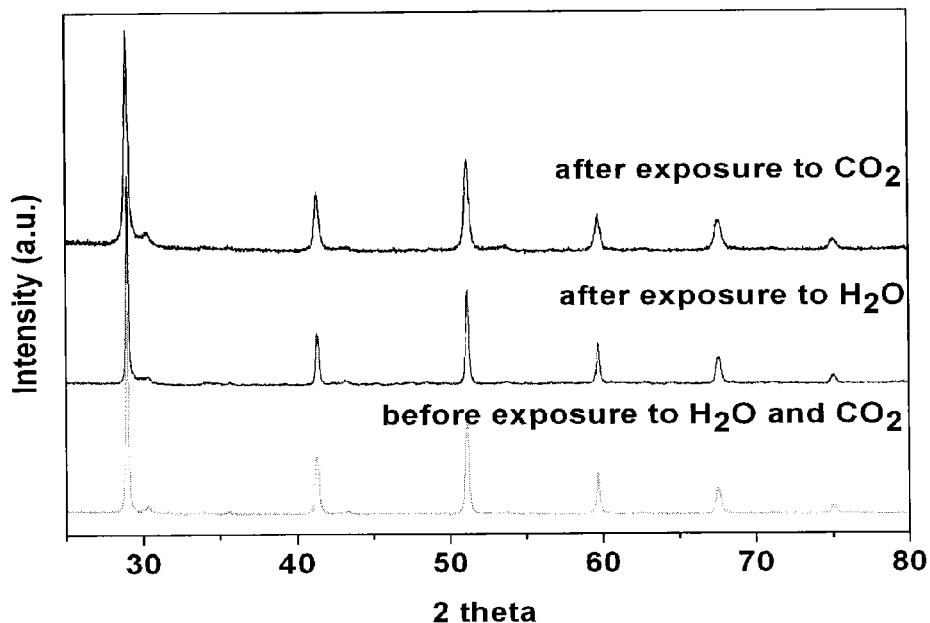
FIG. 2.19
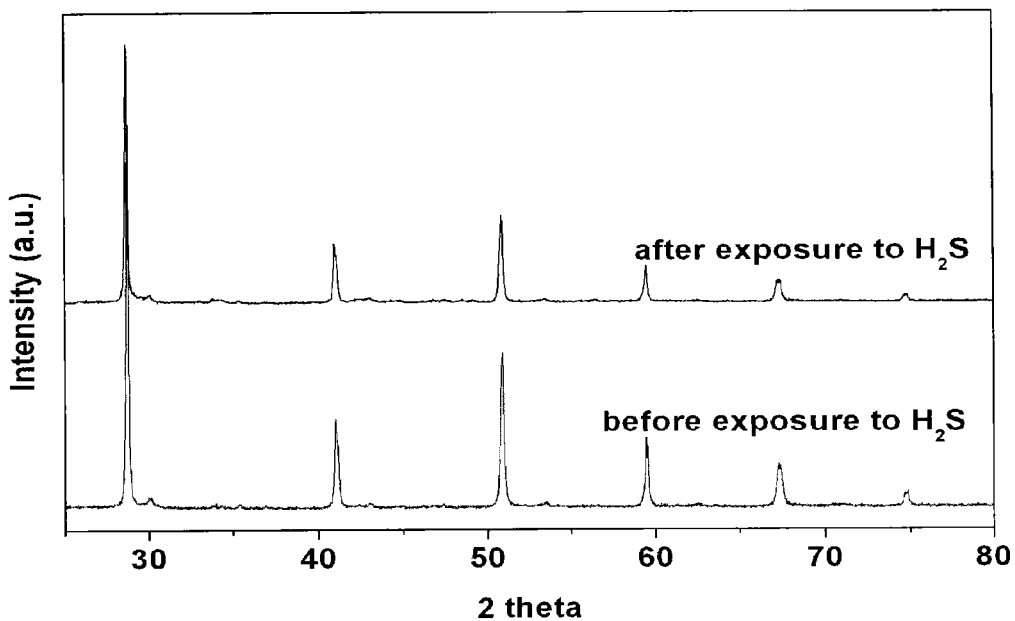
FIG. 2.20

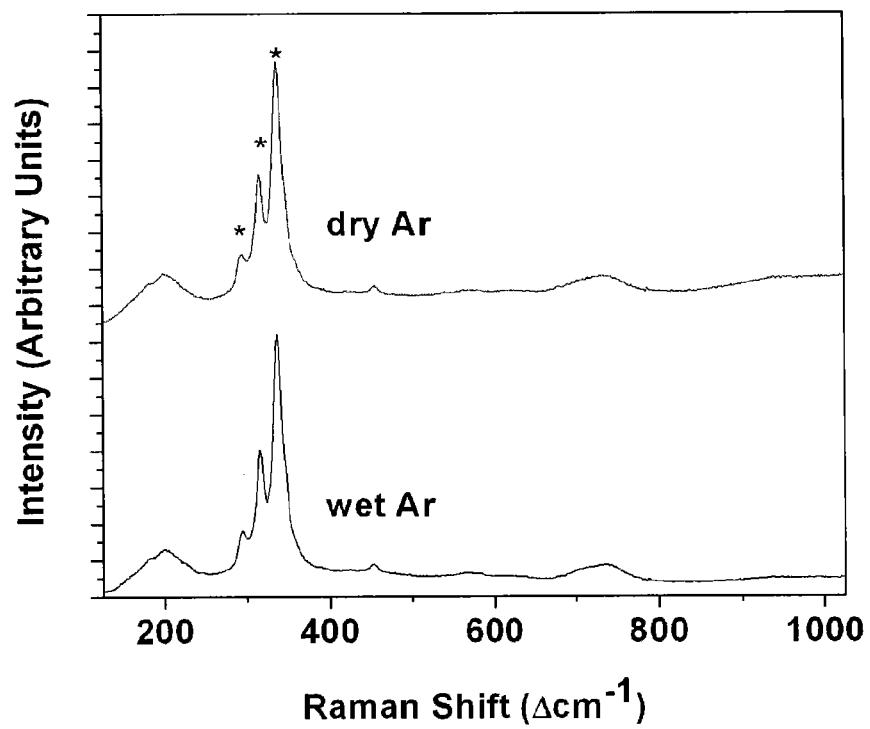
FIG. 2.21
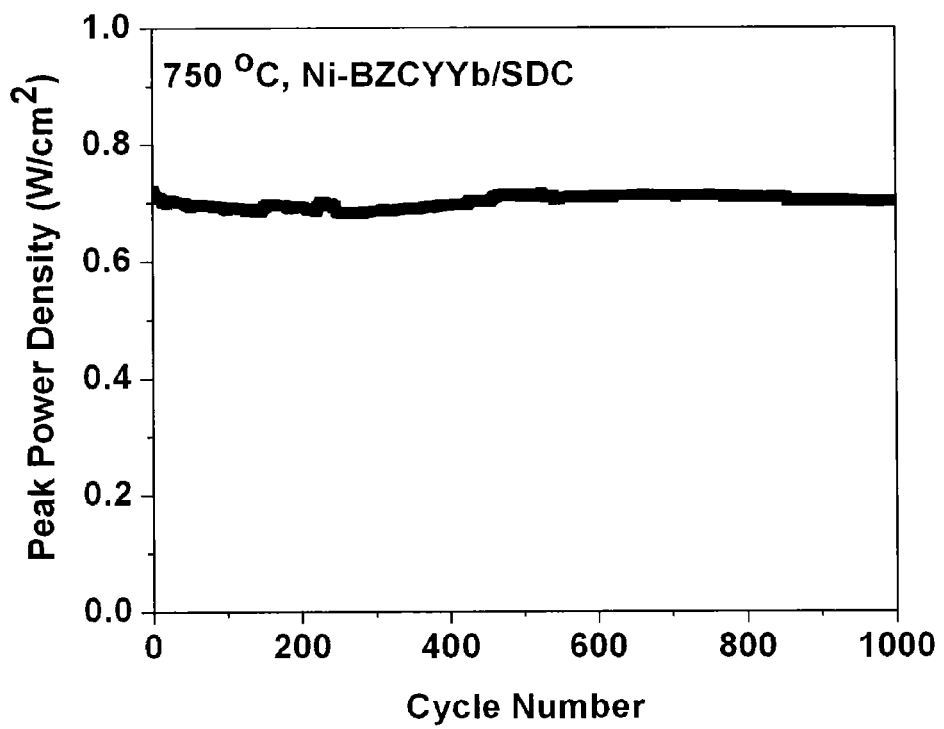
FIG. 2.22

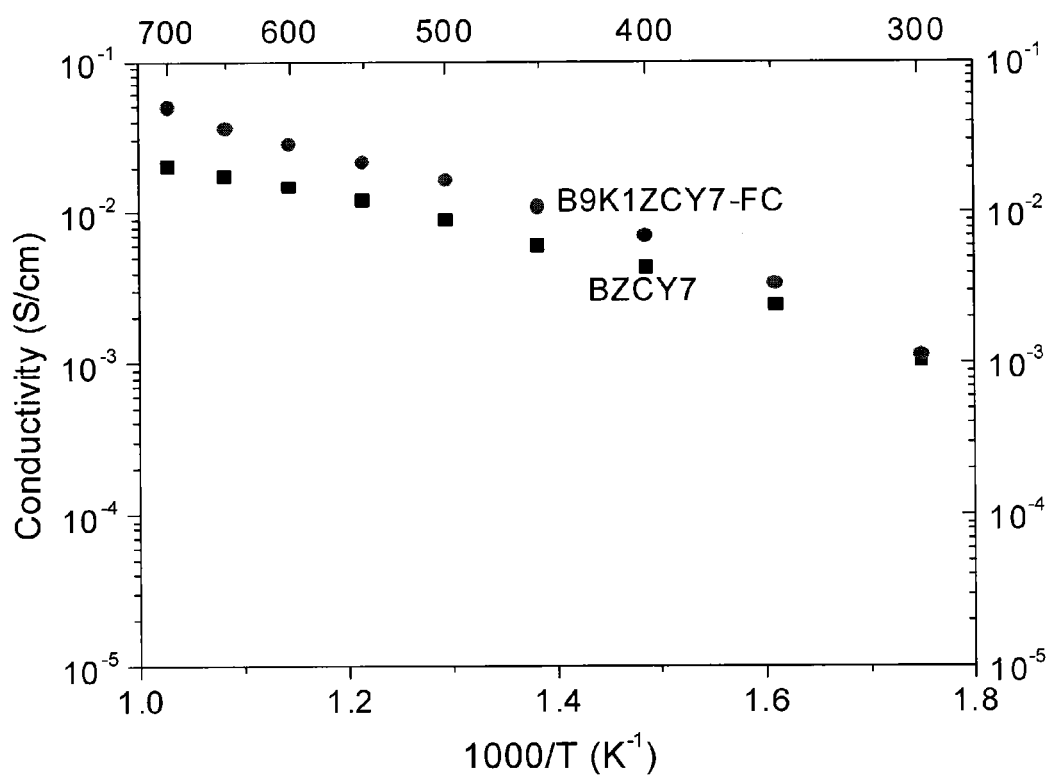
FIG. 3.1

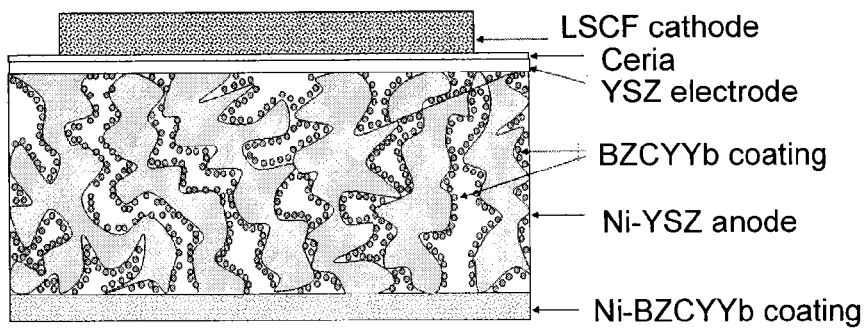
FIG. 4.1A
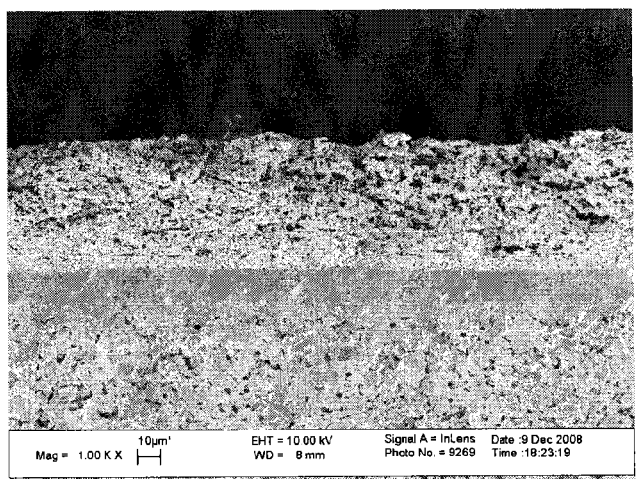
FIG. 4.1B
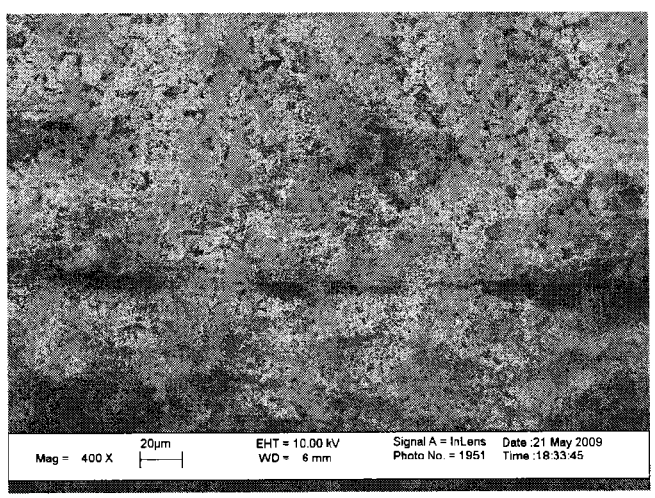
FIG. 4.1C

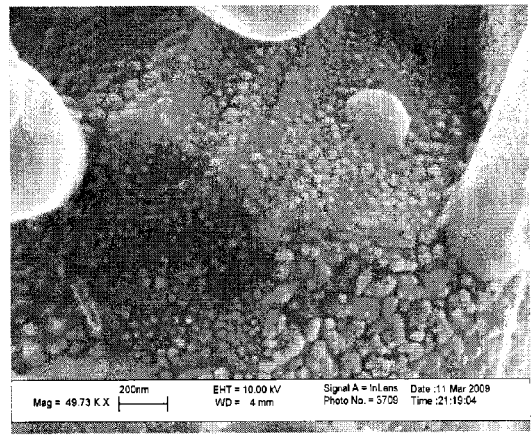
FIG. 4.1D
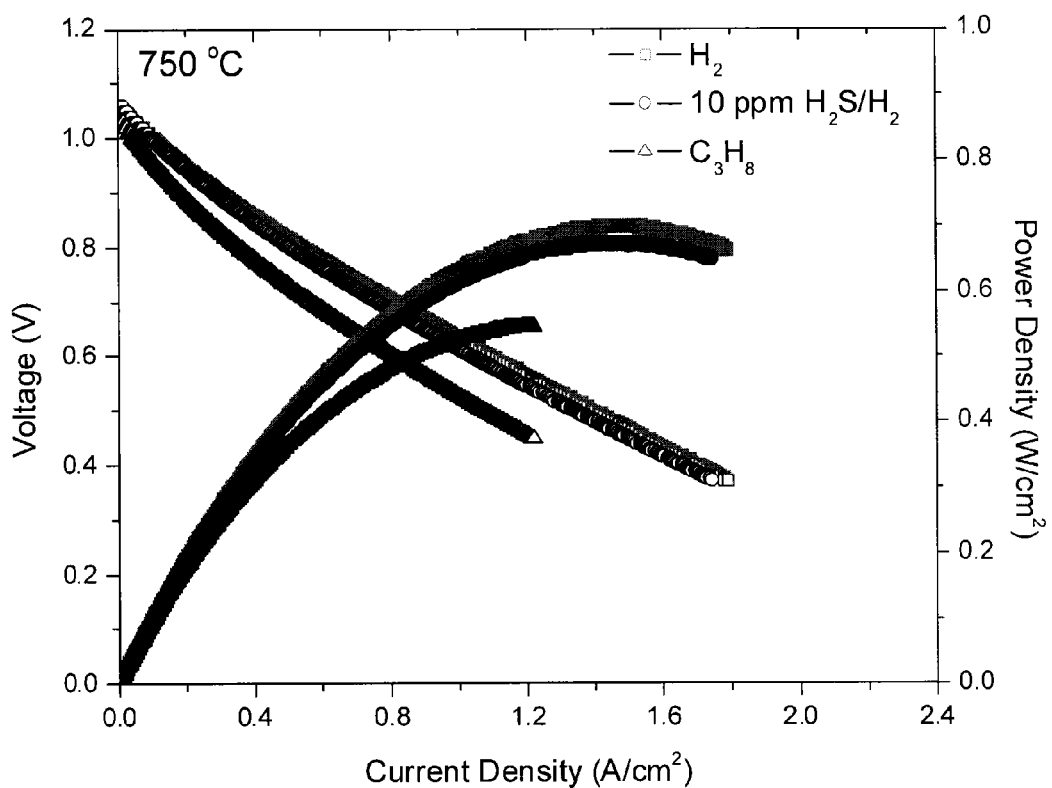
FIG. 4.2

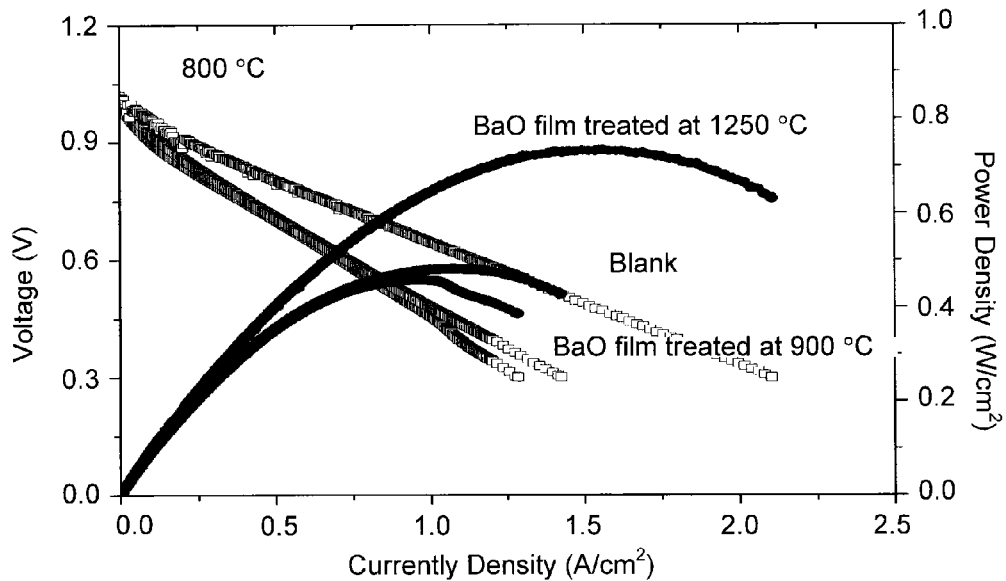
FIG. 5.1A
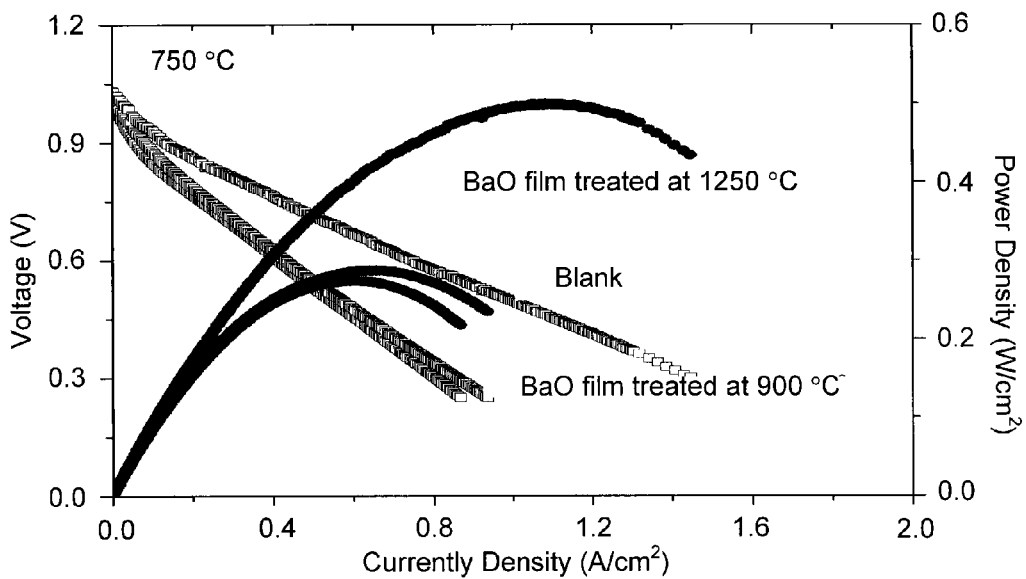
FIG. 5.1B

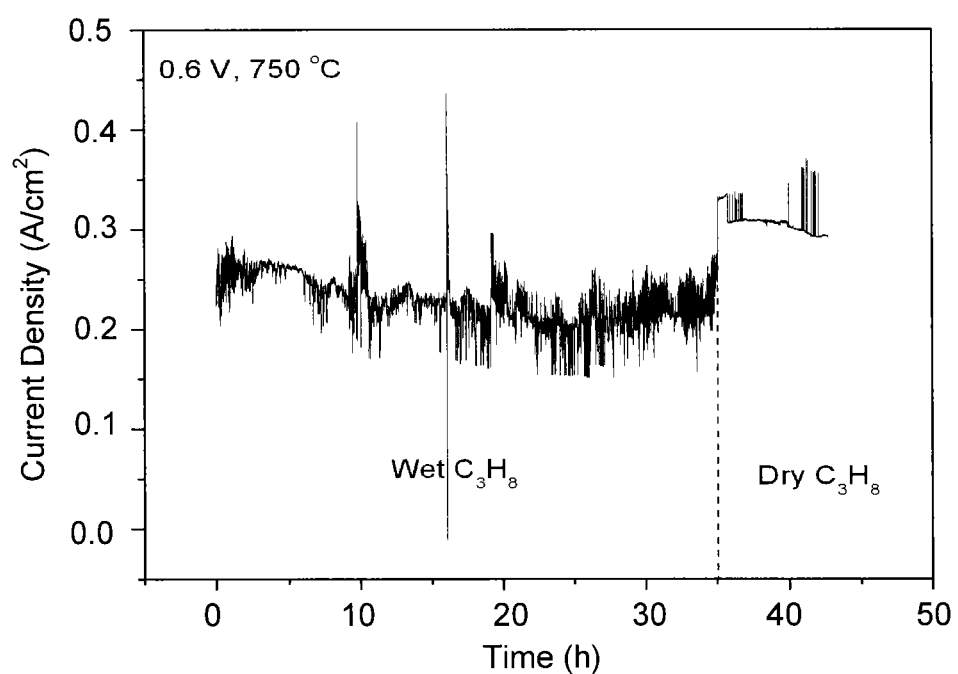
FIG. 5.2

CHEMICAL COMPOSITIONS, METHODS OF MAKING THE CHEMICAL COMPOSITIONS, AND STRUCTURES MADE FROM THE CHEMICAL COMPOSITIONS

CROSS-REFERENCE TO RELATED APPLICATION

This application claims priority to U.S. provisional application entitled, "Novel Anode Materials for SOFCs with High Sulfur and Coking Resistance," having Ser. No. 61/109,522, filed on Oct. 30, 2008, which is entirely incorporated herein by reference. In addition, this application claims priority to U.S. provisional application entitled, "Sulfur and Coking Resistant Ni-YSZ Anode Modified by Materials with Excellent Water Uptake Ability" having Ser. No. 61/218,584, filed on Jun. 19, 2009, which is entirely incorporated herein by reference.

STATEMENT REGARDING FEDERALLY SPONSORED RESEARCH OR DEVELOPMENT

This invention was made with Government support under Agreement No. DE-FG02-06ER15837 awarded by the U.S. Department of Energy. The Government has certain rights in this invention.

BACKGROUND

Unlike polymer electrolyte fuel cells, solid-oxide fuel cells (SOFCs) can use a wide variety hydrocarbon fuels (Solid State Ionics 135, 305 (2000), which is incorporated herein by reference). Because of their high operating temperatures (600 to 800° C.), metal catalysts added to the ceramic anodes can facilitate reforming reactions that generate $H_2$ and CO from hydrocarbons. The conventional anode for an SOFC, a composite consisting of nickel and yttria-stabilized-zirconia (YSZ), has excellent catalytic activity for fuel oxidation, good conductivity for current collection, and unmatched compatibility with YSZ electrolyte for easy cell fabrication, but it is highly susceptible to carbon buildup (coking) and deactivation (poisoning) by contaminants commonly encountered in readily available fuels (Nature Mater. 3, 17 (2004), which is incorporated herein by reference). Some contaminants (e.g., sulfur impurities) can dramatically degrade its performance even at parts per million (ppm) levels (Science 312, 1508 (2006), which is incorporated herein by reference). Sulfur adsorbs strongly on Ni surface and thus blocks the active sites for electrochemical oxidation of fuel, resulting in considerably increased anodic polarization and energy loss.

To overcome these problems, significant efforts have been devoted to the development of new anode materials and novel electrode structures. For example, the use of a ceria-based anodes demonstrate the potential for direct utilization of methane in an SOFC (Nature 400, 649 (1999), which is incorporated herein by reference). Later, the use of a composite anode consisting of copper and ceria led to successful operation of an SOFC with higher hydrocarbons than methane, which are more prone to coking due to higher content of carbon (Nature 404, 265 (2000), which is incorporated herein by reference). However, some practical issues still remain: The low melting point of Cu makes it difficult to fabricate anode-supported cells using conventional co-firing ceramic methods and the poor catalytic activity of Cu for fuel oxidation limits cell power output. In another approach, a catalyst layer (e.g., Ru-ceria) was applied to a conventional Ni-YSZ anode to allow internal reforming of hydrocarbons. The effectiveness of this cell structure was confirmed for direct use of iso-octane without coking in an SOFC with power densities of 0.3 to 0.6 W cm$^{-2}$ at 670 to 770° C. (Science 308, 844 (2005), which is incorporated herein by reference). Although this cell design has demonstrated the possibility of a simple low-cost SOFC system with common automotive fuels, the drawbacks include decreased power density, difficulty in current collection, and the high cost of Ru.

Nickel-free conducting metal oxides have also been developed as anode materials, including $La_{0.75}Sr_{0.25}Cr_{0.5}Mn_{0.5}O_{3-\delta}$, (with a $Ce_{0.8}Gd_{0.2}O_{2-\delta}$ interlayer) (Nature Mater. 2, 320 (2003), which is incorporated herein by reference), $Sr_2Mg_{1-x}Mn_xMoO_{6-\delta}$ (x=0-1) (Science 312, 254 2006, which is incorporated herein by reference), and doped $(La,Sr)(Ti)O_3$ (Nature 439, 568 (2006) and Solid State Ionics 149, 21 (2002), which are incorporated herein by reference). These anode materials showed different degrees of improved tolerance to coking, re-oxidation, and/or sulfur poisoning under various SOFC operating conditions. In many cases, however, the power densities of the SOFCs using Ni-free oxide anodes are less than those demonstrated by conventional Ni-YSZ supported SOFCs with thin electrolytes (by more than 50%). This low efficiency arises from difficulties in fabricating thin-YSZ electrolyte on porous oxide anode supports that arise from delamination or formation of undesirable phases. In some cases, inadequate lateral conductivity (or substantial sheet resistance) of Ni-free oxide anodes also contributes to low power density, especially for SOFC designs with long current collection paths as in fuel cell stacks.

Thus, there is a need in the industry to develop new composition and structures.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1.1A to 1.1D illustrate various configurations of structures of the present disclosure.

FIG. 2.1A illustrates the ionic conductivities of BZCYYb, BZCY, GDC, and YSZ as measured at 400 to 750° C. in wet oxygen (with ~3 v % $H_2O$). FIG. 2.1B illustrates the typical current-voltage characteristics and the corresponding power densities measured at 750° C. for a cell with a configuration of Ni-BZCYYb|BZCYYb|BZCY-LSCF when ambient air was used as oxidant and hydrogen as fuel (with or without 20 ppm $H_2S$ contamination) and for another cell with a configuration of Ni-BZCYYb|SDC|LSCF when dry propane was used as fuel.

FIG. 2.2A illustrates the terminal voltages measured at 750° C. as a function of time for two cells with a configuration of Ni-BZCYYb|BZCYYb|BZCY-LSCF and Ni-BZCYYb|SDC|LSCF operated at a constant current density of 700 mA/cm$^2$ as the fuel was switched from clean $H_2$ to $H_2$ contaminated with different concentrations of $H_2S$ (the number in each time interval represents the concentration of $H_2S$ in wet hydrogen in ppm). Impedance spectra measured under OCV conditions at 750° C. for a cell with a configuration of Ni-BZCYYb|SDC|LSCF in clean $H_2$ and in $H_2$ contaminated with 20 ppm $H_2S$ for FIG. 2.2B, dry $H_2S/H_2$ gases and FIG. 2.2C, wet $H_2S/H_2$ gases (with ~3 v % $H_2O$).

FIGS. 2.3A and 2.3B illustrates in situ Raman spectra collected from BZCYYb samples (A) at room temperature under wet argon gas at various exposure times following a drying treatment at 400° C. under evacuation for 10 h; (B) at 500° C. in dry and wet argon.

FIG. 2.4 illustrates open circuit voltages measured at 750° C. as a function of time for a cell with a configuration of Ni-BZCYYb|YSZ|LSCF with dry and wet propane as the fuel, and the terminal voltages for another cell with a configuration of Ni-BZCYYb|SDC|LSCF operated at 600 mA/cm$^2$ using dry propane as fuel. Stationary air was used as oxidant in all cases.

FIG. 2.5 illustrates XRD patterns of $BaZr_{0.1}Ce_{0.7}Y_{0.2-x}Yb_xO_{3-\delta}$ (x=0-0.2) powders.

FIG. 2.6 illustrates the conductivities of $BaZr_{0.1}Ce_{0.7}Y_{0.2-x}Yb_xO_{3-\delta}$ (x=0-0.2) in wet oxygen at different temperatures as a function of the concentration of Yb. The number by each set of data represents the absolute temperature at which the conductivity was measured.

FIG. 2.7 illustrates open circuit voltages (OCV) for a cell with a configuration of Pt|BZCYYb|Pt with wet $H_2$ (~3 v % $H_2O$) as fuel and air as oxidant.

FIG. 2.8 illustrates open circuit voltages measured at 750° C. for cells with configurations of Ni-BZCYYb|YSZ|LSCF and Ni-BZCY|YSZ|LSCF with wet propane as the fuel and stationary air as oxidant.

FIG. 2.9A illustrates a cross-sectional view of a cell with a configuration of Ni-BZCYYb|BZCYYb|BZCY-LSCF and FIG. 2.9B illustrates a surface view of the BZCYYb electrolyte as fabricated using a solution coating process.

FIG. 2.10 illustrates typical current-voltage characteristics and the corresponding power densities measured at 650° C. for a cell with a configuration of Ni-BZCYYb|BZCYYb|BZCY-LSCF when ambient air was used as oxidant and wet hydrogen as fuel.

FIG. 2.11 illustrates the terminal voltage for a cell with a configuration of BZCYYb/Ni-YSZ|YSZ|LSCF operated at 500 mA/cm$^2$ in wet hydrogen containing 10 ppm $H_2S$ at 750° C. The Ni-YSZ anode was infiltrated with a BZCYYb solution to introduce a thin coating of BZCYYb on the surface of the Ni-YSZ anode.

FIG. 2.12 illustrates the terminal voltage for a Ni-BZCYYb|SDC|LSCF cell operated at a constant current density of 700 mA/cm$^2$ in wet $H_2$ and wet $H_2$ containing 30 ppm $H_2S$ at 750° C. The fuel was switched to wet $H_2$ containing 30 ppm $H_2S$ after a few hours operation in wet $H_2$.

FIG. 2.13A illustrates the surface morphology of Ni-BZCYYb anode in a cell with a configuration of Ni-BZCYYb|YSZ|LSCF, while FIG. 2.13B illustrates a typical EDS spectrum collected from the Ni grain area in a Ni-BZCYYb composite anode. (The spectrum also shows Au, which is from the Au coating on the sample surface to minimize charging during SEM analysis).

FIG. 2.14 illustrates raman spectra collected from Ni-BZCYYb anode in a cell with a configuration of Ni-BZCYYb|YSZ|LSCF after exposure to (a) dry and (b), (c) wet propane at 750° C. for 3 hours under OCV condition.

FIG. 2.15 illustrates the open circuit voltages measured at 750° C. for cells with configurations of Ni-BZCYYb|YSZ|LSCF and Ni-GDC|YSZ|LSCF with wet propane as the fuel and stationary air as oxidant.

FIG. 2.16 illustrates the terminal voltages measured at a current density of 300 mA/cm$^2$ and OCVs (intermittently monitored) at 750° C. for a cell with a configuration of Ni-BZCYYb|YSZ|LSCF with wet (with ~3 v % $H_2O$) propane as fuel and stationary air as oxidant.

FIG. 2.17 illustrates a typical concentration profile of the outlet gas mixture monitored by mass spectrometer during operation of a Ni-BZCYYb|YSZ|LSCF cell (electrode area 0.21 cm$^2$) at a constant current density of 300 mA/cm$^2$ in wet $C_3H_8$ (~3 v % $H_2O$). The flow rates for the inlet and outlet gas are 2.0 and 4.5 mL/min, respectively.

FIG. 2.18A illustrates the morphologies of the Ni-BZCYYb anode of a Ni-BZCYYb|SDC|LSCF cell (a) before and FIG. 2.18B shows this after operation in dry propane at a constant current density of 600 mA/cm$^2$ for 24 hours. FIG. 2.18C illustrates a cross-sectional view of the cell after operation showing the anode/electrolyte interface.

FIG. 2.19 illustrates the XRD patterns for $BaZr_{0.1}Ce_{0.7}Y_{0.1}Yb_{0.1}O_{3-\delta}$ powders before and after exposure to $H_2$ with 50 vol % $H_2O$ or $H_2$ with 50 vol % $CO_2$ at 750° C. for 300 h.

FIG. 2.20 illustrates the XRD patterns for $BaZr_{0.1}Ce_{0.7}Y_{0.1}Yb_{0.1}O_{3-\delta}$ powders before and after exposure to 50 ppm $H_2S/H_2$ at 750° C. for 50 h.

FIG. 2.21 illustrates the raman spectra collected in-situ at room temperature (25° C.) under wet and dry conditions.

FIG. 2.22 illustrates the peak power density versus cycle number for a Ni-BZCYYb|SDC|LSCF cell at 750° C. in wet $H_2$. Repeated power cycles from open circuit voltage (OCV) to a terminal voltage of 0.4 V and back to OCV.

FIG. 3.1 illustrates a comparison of the ionic conductivity as a function of temperature for B9K1ZCY7 and BZCY7 electrolyte materials.

FIG. 4.1A illustrates a schematic diagram of cell with Ni-YSZ anode modified by inner BZCYYb infiltrated and outer Ni-BZCYYb catalyst layers; FIG. 4.1B illustrates a cross-sectional morphologies of full cell consisting of modified Ni-YSZ anode, YSZ electrolyte, SDC buffer layer and LSCF cathode; FIG. 4.1C illustrates the interface between Ni-YSZ and Ni-BZCYYb anode; and FIG. 4.1D illustrates BZCYYb nanoparticles in Ni-YSZ porous anode.

FIG. 4.2 illustrates the cell voltage and power density as a function of current density in $H_2$, 10 ppm $H_2S/H_2$ and $C_3H_8$ for cells with BZCYYb modified Ni-YSZ anodes.

FIG. 5.1A and FIG. 5.1B show the current-voltage characteristics and the corresponding power densities at 800° C. and 750° C., respectively, in $H_2$ for YSZ based anode-supported fuel cells with/without BaO thin film.

FIG. 5.2 shows the current density of a typical cell with BaO modified Ni-YSZ anode as function of time in wet and dry propane at 750° C.

SUMMARY

Embodiments of the present disclosure include chemical compositions, structures, anodes, cathodes, electrolytes for solid oxide fuel cells, fuel cells, fuel cell membranes, separation membranes, catalytic membranes, sensors, coatings for electrolytes, electrodes, membranes, and catalysts, and the like, are disclosed.

One exemplary chemical composition, among others, includes: $ABO_3$, wherein A is selected from the group consisting of: A1 and $A2_xA3_y$, where x+y is equal to 1, wherein B is selected from the group consisting of: $Zr_mCe_n$, $Zr_oCe_pB1_q$, $Zr_rCe_sB2_tB3_u$, where m+n is equal to 1, where o+p+q is equal to 1, where r+s+t+u is equal to 1, wherein A1, A2, and A3 are each independently selected from the group consisting of: Ba, K, Ca, and La, wherein B1, B2, and B3 are each independently selected from the group consisting of: a rare earth element, a transition metal, and a precious metal.

One exemplary structure, among others, includes: a composite of Ni and $ABO_3$, wherein A is selected from the group consisting of: A1 and A2$_x$A3$_y$, where x+y is equal to 1, wherein B is selected from the group consisting of: Zr$_m$Ce$_n$, Zr$_o$Ce$_p$B1$_q$, Zr$_r$Ce$_s$B2$_t$B3$_u$, where m+n is equal to 1, where o+p+q is equal to 1, where r+s+t+u is equal to 1, wherein A1, A2, and A3 are each independently selected from the group consisting of: Ba, K, Ca, and La, wherein B1, B2, and B3 are each independently selected from the group consisting of: a rare earth element, a transition metal, and a precious metal One exemplary structure, among others, includes: a Ni-YSZ composite, wherein YSZ is yttria-stabilized zirconia; and a layer of ABO$_3$ disposed on at least one surface of the Ni-YSZ composite, wherein A is selected from the group consisting of: A1 and A2$_x$A3$_y$, where x+y is equal to 1, wherein B is selected from the group consisting of: Zr$_m$Ce$_n$, Zr$_o$Ce$_p$B1$_q$, Zr$_r$Ce$_s$B2$_t$B3$_u$, where m+n is equal to 1, where o+p+q is equal to 1, where r+s+t+u is equal to 1, wherein A1, A2, and A3 are each independently selected from the group consisting of: Ba, K, Ca, and La, wherein B1, B2, and B3 are each independently selected from the group consisting of: a rare earth element, a transition metal, and a precious metal.

One exemplary structure, among others, includes: a Ni-YSZ composite, wherein YSZ is yttria-stabilized zirconia, wherein the Ni-YSZ composite is porous; and an ABO$_3$ disposed in the pores of the Ni-YSZ composite, wherein A is selected from the group consisting of: A1 and A2$_x$A3$_y$, where x+y is equal to 1, wherein B is selected from the group consisting of: Zr$_m$Ce$_n$, Zr$_o$Ce$_p$B1$_q$, Zr$_r$Ce$_s$B2$_t$B3$_u$, where m+n is equal to 1, where o+p+q is equal to 1, where r+s+t+u is equal to 1, wherein A1, A2, and A3 are each independently selected from the group consisting of: Ba, K, Ca, and La, wherein B1, B2, and B3 are each independently selected from the group consisting of: a rare earth element, a transition metal, and a precious metal.

One exemplary structure, among others, includes: an anode and a solid electrolyte disposed on at least one side of the anode, wherein the anode is a composite selected from the group consisting of: Ni and ABO$_3$, where ABO$_3$ that has a precious metal dopant, wherein A is selected from the group consisting of: A1 and A2$_x$A3$_y$, where x+y is equal to 1, wherein B is selected from the group consisting of: Zr$_m$Ce$_n$, Zr$_o$Ce$_p$B1$_q$, Zr$_r$Ce$_s$B2$_t$B3$_u$, where m+n is equal to 1, where o+p+q is equal to 1, where r+s+t+u is equal to 1, wherein A1, A2, and A3 are each independently selected from the group consisting of: Ba, K, Ca, and La, wherein B1, B2, and B3 are each independently selected from the group consisting of: a rare earth element, a transition metal, and a precious metal, wherein the solid electrolyte is selected from the group consisting of: ABO$_3$; YSZ, where YSZ is yttria-stabilized zirconia; doped CeO$_2$, LSGM, wherein LSGM is La$_a$Sr$_{1-a}$Ga$_b$Mg$_{1-b}$O$_3$, where a is about 0.8 to 0.9 and b is about 0.8 to 0.9; a composite of BaZr$_m$Ce$_n$O$_3$(H$^+$) and YSZ(O$^{2-}$); and a composite of BaZr$_m$Ce$_n$O$_3$(H$^+$) and doped CeO$_2$(O$^{2-}$).

One exemplary structure, among others, includes: a Ni-YSZ composite anode and a thin film selected from the group consisting of: a BaO thin film and a K$_2$O thin film.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

As used herein, the term "adjacent" refers to the relative position of one or more features or structures, where such relative position can refer to being near or adjoining. Adjacent structures can be spaced apart from one another or can be in actual contact with one another. In some instances, adjacent structures can be coupled to one another or can be formed integrally with one another.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure include chemical compositions, structures, anodes, cathodes, electrolytes for solid oxide fuel cells, fuel cells, fuel cell membranes, separation membranes, catalytic membranes, sensors, coatings for electrolytes, electrodes, membranes, and catalysts, and the like, are disclosed.

Embodiments of the present disclosure provide for compositions that can be used to produce structures (e.g., anodes, cathodes, membranes, catalysts, electrodes, and the like) that have high electrical conductivity (e.g., about 1.3 to $6.4 \times 10^{-2}$ $\Omega^{-1} cm^{-1}$ at relatively low temperatures (about 500 to 700° C.)) and chemical and thermal stability over a wide range of conditions (e.g., no phase change upon exposure in $H_2$ containing 50 v % $CO_2$ or 50 v % $H_2O$ at 750° C.). In an embodiment, the composition allows for the rapid transport of protons and oxide ion vacancies, which gives the structure (e.g., in a fuel cell) a distinct advantage by allowing the structure to supply and take up water thereby using less steam. The content of the composition can be modified so that the structure is an anode or a cathode and/or so the structure has certain characteristics (e.g., catalytic, high ionic, proton, and/or electron conductivity, chemical stability, and/or thermal stability, and the like). In an embodiment, use of the composition in a structure can reduce carbon buildup and reduce or prevent sulfur poisoning, which can be advantageous in fuels cells.

Embodiments of the present disclosure provide for solid oxide fuel cells having chemical stability. One or more of the components in the solid oxide fuel cell can be made using chemical compositions of the present disclosure. For example, embodiments of the present disclosure provide for tolerance (e.g., can directly use dry propane) to coking and fuel poisoning (e.g., no degradation up to 50 ppm $H_2S/H_2$) on one or more of the components in the solid oxide fuel cell. Specifically, embodiments of the present disclosure have a high tolerance for sulfur poisoning, which allows the fuel cell to operate under varying conditions (e.g., use of less steam) and use various fuels (e.g., hydrocarbon fuel, coal gas, renewable fuels). In an embodiment, the advantage of removing sulfur from the anode allows the solid oxide fuel cell to use less steam in the reformation of carbon-containing fuels.

Embodiments of the present disclosure have good compatibility with components of current SOFCs system such as NiO, YSZ, and doped $CeO_2$. Thus, it is convenient to fabricate anode-supported type device using traditional ceramic processing techniques.

As mentioned above, embodiments of the present disclosure include chemical compositions. Embodiments of the composition include compositions, compositions with dopants, composites, and the like. The compositions can be used to form anodes, cathodes, electrolytes, separation (e.g., $H_2$) membranes, layers to be disposed on the cathodes, anodes, membranes, and the like.

In addition, compositions of the present disclosure can be used as catalysts in dry and steam processing, oxidative coupling of methane to C2 and syngas, decomposition of alcohols, reactions of alkanes and alkenes, forward and/or reverse water gas shifts, steam electrolysis, decomposition of $H_2S$ and $NO_x$ (where x is 0, 1, or 2), synthesis and decomposition of ammonia, and the like. In an embodiment, the membrane can be $BaZr_mCe_nO_3$ wherein m and n are defined below, which could be used in catalytic applications.

Furthermore, compositions and structures of the present disclosure can be used in sensors in the open circuit mode, proton conducting electrolyte membranes can be used in hydrogen, steam, alcohol, or hydrocarbon sensors (e.g., leak detection in chemical plants, coal mines, and the like).

In an embodiment, the composition includes $ABO_3$. The A site dopant can be A1 or $A2_xA3_y$, where x+y is equal to 1. A1, A2, and A3 are each independently selected from Ba, K, Ca, and La. In an embodiment, A1 is Ba, and in another embodiment, A2 is Ba and A3 is K, where x is about 0.8 to 1 and y is about 0.01 to 0.2.

The B site dopant can be $Zr_mCe_n$, where m+n is equal to 1; $Zr_oCe_pB1_q$, where o+p+q is equal to 1; and $Zr_rCe_sB2_tB3_u$, where r+s+t+u is equal to 1. B1, B2, and B3 are each independently selected from a rare earth element, a transition metal, and a precious metal. In an embodiment, B1 is Y, and in another embodiment B2 is Y and B3 is Yb, where t is about 0.01 to 0.2 and u is about 0.01 to 0.2.

Embodiments of the $ABO_3$ can include: $A1Zr_mCe_n$, $A1Zr_oCe_pB1_q$, $A1Zr_rCe_sB2_tB3_u$, $A2A3Zr_mCe_n$, $A2A3Zr_oCe_pB1_q$ and $A2A3Zr_rCe_sB2_tB3_u$. In an embodiment, $ABO_3$ is $BaZr_mCe_nO_3$, wherein m is about 0.01 to 1 and n is about 0.01 to 1 or m is about 0.1 to 1 and n is about 0.01 to 1. Illustrative examples are shown in the Table below.

| | |
|---|---|
| $A1Zr_mCe_n$ | $BaZr_{0.2}Ce_{0.8}O_3$ |
| $A1Zr_oCe_pB1_q$ | $BaZr_{0.1}Ce_{0.7}Y_{0.2}O_3$ |
| $A1Zr_rCe_sB2_tB3_u$ | $Ba(Zr_{0.1}Ce_{0.7}Y_{0.1}Yb_{0.1})O_3$ |
| $A2A3Zr_mCe_n$ | $(Ba_{0.9}K_{0.1})(Zr_{0.2}Ce_{0.8})O_3$ |
| $A2A3Zr_oCe_pB1_q$ | $(Ba_{0.9}K_{0.1})(Zr_{0.1}Ce_{0.7}Y_{0.2})O_3$ |
| $A2A3Zr_rCe_sB2_tB3_u$ | $(Ba_{0.9}K_{0.1})(Zr_{0.1}Ce_{0.7}Y_{0.1}Yb_{0.1})O_3$ |

Subscript x can be about 0.01 to 1 or about 0.8 to 1. Subscript y can be about 0.01 to 1 or about 0.01 to 0.2.

Subscript m is about 0.01 to 1 or about 0.1 to 1. Subscript n is about 0.01 to 1 or about 0.01 to 1.

Subscript o is about 0.01 to 1 or about 0.1 to 1. Subscript p is about 0.01 to 1 or about 0.01 to 1. Subscript q is about 0.01 to 0.2 or about 0.01 to 0.2.

Subscript r is about 0.01 to 1 or about 0.1 to 1. Subscript s is about 0.01 to 1 or about 0.01 to 1. Subscript t is about 0.01 to 0.2 or about 0.01 to 0.2. Subscript u is about 0.01 to 0.2 or about 0.01 to 0.2.

In an embodiment, the amount of A site dopant relative to the amount of A site is about 0.01 to 0.2 or about 0.01 to 0.2. In an embodiment, the amount of B site dopant relative to the amount of B site is about 0.01 to 0.2 or about 0.01 to 0.2.

In an embodiment, the rare earth element, the transition metal, and/or the precious metal can be selected based on which has the least or a limited effect on the basicity of adjacent oxygen, where the chemical match depends, at least in part, upon the ionic radius and/or electronegativity of the rare earth element, the transition metal, and/or the precious metal. The dopant can be selected to improve conductivity with little or no sacrifice of chemical stability. The A site dopant described above can be selected based on this same criteria.

In an embodiment, the rare earth metal can be selected from Y, Yb, Gd, Sm, Sc, Lu, Dy, and Nd. In an embodiment, the rare earth metal can be Y and/or Yb.

In an embodiment, the transition metal can be selected from Co, Fe, Mn, Pr, and Ni. In an embodiment, the transition metal can be Co and/or Pr.

In an embodiment, the precious metal can be selected from Cu, Au, Ru, Ag, Pd, and Pt. In an embodiment, the precious metal can be Ru and/or Pd.

Embodiments of the $ABO_3$ composition can be produced by traditional solid state reaction methods. Additional details are provided in the Examples.

In an embodiment, $BaZr_mCe_nO_3$, can be produced by mixing $BaCO_3$, $CeO_2$ and $ZrO_2$ under conditions of about 1100 to 1400° C. at 10 h.

It should also be noted that $ABO_3$ can be denoted as XX-doped-$ABO_3$, where XX is the dopant element. The term dopant refers to the utilization of one, two or more doping elements in one crystallographic site: A or B site. For example, in $BaZr_{0.1}Ce_{0.7}Y_{0.1}Yb_{0.1}O_3$, Y and Yb are dopants on the B-site for $Ba(Zr_1.xCex)O_3$.

One may want to dope $ABO_3$ to impart some characteristic to the composition. In an embodiment, a dopant such as a precious metal (e.g., Ru) can be used to enhance the characteristics (e.g., catalytic activity and electron conductivity) of the composition so that it can be used to make an anode structure. In an embodiment, a dopant such as a transition metal (e.g., Co) can be used to enhance the characteristics (e.g., electron conductivity and catalytic activity) of the composition so that it can be used to make a cathode structure. In an embodiment, the dopants such as Y and/or Yb can be used to enhance the electrical conductivity and catalytic characteristics of the composition.

Compounds having the general formula: $A1Zr_oCe_pB1_q$, $A1Zr_rCe_sB2_tB3_u$, $A2A3Zr_mCe_n$, $A2A3Zr_oCe_pB1_q$, and $A2A3Zr_rCe_sB2_tB3_u$, can be readily synthesized by solid state reactions. Additional details are provided in the Examples. In general, embodiments of the present disclosure can be prepared by firing precursor compounds such as the corresponding oxides and/or carbonates.

$BaCO_3$, $CeO_2$, $ZrO_2$ are generally used as precursors. Depending on compositions and dopants, different precursors are used. For example, $Y_2O_3$ and $Yb_2O_3$ should be introduced into mixed $BaCO_3$, $CeO_2$, and $ZrO_2$ in order to prepare $BaZr_{0.1}Ce_{0.7}Y_{0.1}Yb_{0.1}O_3$. These precursors are mixed using ball-milling with stabilized zirconia media in ethanol, for example, for about 48 h. The resultant mixture can be dried at about 60° C. for about 24 h, followed by calcination at about 1100° C. for about 10 h. The ball milling and calcination under same conditions were repeated twice to obtain pure phase. Modification to this procedure can be made depending on the precursors.

In general, these compounds can be formed by firing the corresponding oxides (e.g., $BaCO_3$, $CeO_2$, $ZrO_2$, and the appropriate dopant oxides) or carbonates at high temperatures as described herein. Additional details are provided in the Examples.

In an embodiment, the composition includes a composite of Ni and $ABO_3$, also referred to as Ni-$ABO_3$, which can be used as an anode structure in a fuel cell. $ABO_3$ can include any description of $ABO_3$ provided herein. The precursor to form Ni can be NiO. In general, $ABO_3$ and NiO will be co-fired in air at high temperatures to for the desired microstructure. Upon exposure to a fuel, however, NiO will be reduced to pure Ni. Thus, it is pure Ni metal that gives the desired properties under service conditions, and will be referred to as Ni-$ABO_3$. The ratio of Ni to $ABO_3$ can be about 80:20 to 20:80 or about 65:35 to 35:65. In an embodiment, $ABO_3$ is $BaZr_mCe_nO_3$, wherein m is about 0.01 to 1 and n is about 0.01 to 1 or m about 0.1 to 1 and n is about 0.01 to 1. Advantages of $BaZr_mCe_nO_3$ include high electrical conductivity, good catalytic activity, water uptake ability, and excellent stability. Also, it is compatible with other components in SOFC systems.

In an embodiment, $ABO_3$ can be readily synthesized by solid state reactions. In an illustrative example, $BaZr_mCe_nO_3$ can be produced by reaction $BaCO_3$, $CeO_2$, and $ZrO_2$. Other embodiments can be produced by varying the dopants (e.g., using precursor materials). For example, $Y_2O_3$ and $Yb_2O_3$ should be introduced into mixed $BaCO_3$, $CeO_2$ and $ZrO_2$ in order to prepare $BaZr_{0.1}Ce_{0.7}Y_{0.1}Yb_{0.1}O_3$. These precursors are mixed using ball-milling with stabilized zirconia media in ethanol for 48 h. The resultant mixture was dried at 60° C. for 24 h, followed by calcination at 1100° C. for 10 h. The ball milling and calcination under same conditions were repeated twice to obtain pure phase. Modification to this procedure can be made depending on the precursors.

In an embodiment, the composition includes $BaZr_mCe_nO_3$ doped with a transition metal or a precious metal. In a particular embodiment, the transition metal is Co, which imparts electron conductivity and catalytic activity characteristics, which is advantageous because it can effectively dissociate oxygen and transportions and electrons in the cathode. In another embodiment, the precious metal is Ru, which imparts electron conductivity and catalytic activity characteristics, which is advantageous because it can accelerate reforming of hydrocarbon and release electrons. These compounds can be made in manner consistent with methods to prepare compounds described herein.

In an embodiment, the composition includes is $BaZr_m$-$Ce_nO_3$ doped with two rare earth elements. In a particular embodiment, the rare earth metals are Y and Yb, which impart the ionic conductivity and water adsorption capability, which is advantageous because it can enhance the ionic transport and removal of sulfur and carbon.

As noted above, embodiments of the present disclosure include a structure including one or more of the following: an anode, an electrolyte, and a cathode. In general, the electrolyte is disposed between the anode and the cathode. Embodiments of the structures can be fuel cells, solid oxide fuel cells, liquid or gas processing fuel cells, and the like. The anode can have a thickness of about 50 to 500 μm. The electrolyte can have a thickness of about 10 to 200 μm. The cathode can have a thickness of about 30 to 500 μm.

FIGS. 1.1A to 1.1D illustrate cross-sections of various structure configurations. In addition to these structures, a layer of material can be disposed on and/or between each of these configurations. In an embodiment, the anode/electrolyte bilayers can be fabricated by traditional co-pressing or tapecasting, followed by sintering at about 1400° C. The additional anode layer can be prepared by screen printing or drop coatings.

In an embodiment, the structure includes a Ni-YSZ composite, where YSZ is yttria-stabilized zirconia, and a layer of $ABO_3$ disposed on the Ni-YSZ composite. YSZ is zirconia ($ZrO_2$) that is partially or fully stabilized by yttria ($Y_2O_3$). YSZ is a zirconium oxide based ceramic. The addition of the yttria stabilizes the zirconia at room temperature. In an embodiment, the relative amounts of zirconia and yttria are about 8 mol % $Y_2O_3$ in YSZ. $ABO_3$ can include any description of $ABO_3$ provided herein. In an embodiment, $ABO_3$ is $BaZr_mCe_nO_3$, wherein m is about 0.01 to 1 and n is about 0.01 to 1 or m is about 0.1 to 1 and n is about 0.01 to 1. In an embodiment, $ABO_3$ includes an A site and/or a B site dopant, such as those described above. In particular, the A site dopant can be K. The B site dopant can be Y and Ru.

In an embodiment, a YSZ solid electrolyte is disposed on at least one surface of the Ni-YSZ composite. For example, the solid electrolyte is disposed on the side opposite the layer of $ABO_3$. The layer can be about 10 to 200 μm thick or about 10 to 30 μm thick. The solid electrolyte can be disposed using techniques such as dry press or tape casting.

In another embodiment, the structure includes a Ni-YSZ composite having pores, wherein $ABO_3$ is disposed within portions (e.g., 30 to 100% coverage) of the pores and/or on a surface of the Ni-YSZ composite. In an embodiment, the pores have a diameter of about 20 nm to 5 μm or about 100 nm to 2 μm. The pores extend into the Ni-YSZ composite and may penetrate about 20%, about 40%, about 60%, about 80%, or all the way through the Ni-YSZ composite. The pores may or may not have a uniform diameter. The pores can be formed using pore formers such as starch and carbon black, for example.

In an embodiment, the $ABO_3$ is a layer disposed on portions (e.g., 30 to 100% coverage) of the pores. The layer can be about 10 to 500 μm thick or about 30 to 100 μm thick. In another embodiment, the $ABO_3$ are nanoparticles disposed on portions (e.g., 30 to 100% coverage) of the pores. The nanoparticles can have a diameter of 1 to 50 nm or about 5 to 20 nm. In an embodiment, the $ABO_3$ can be a layer and nanoparticles disposed on portions (e.g., 30 to 100% coverage) of the pores. In an embodiment, the $ABO_3$ can be $BaZr_mCe_nO_3$, where m is about 0.01 to 1 and n is about 0.01 to 1 or m is about 0.1 to 1 and n is about 0.01 to 1. In an embodiment, the $BaZr_mCe_nO_3$ are nanoparticles having a diameter of about 1 to 50 nm. In an embodiment, the $ABO_3$ layer can be prepared by dip-coating, screen printing, and/or tape casting on Ni-YSZ layer. In an embodiment, the nanoparticles can be disposed in the pores using a vacuum to force the nanoparticles into the pores.

In an embodiment, doped $BaZr_mCe_nO_3$ can be formed from precursor was prepared by mixing Ba $(NO_3)_2$, ZrO$(NO_3)_2$, $Ce(NO_3)_3 \cdot 6H_2O$, and nitrates for dopants. 0.25 mol/L aqueous nitrate solutions of doped $BaZr_mCe_nO_3$ was mixed with ethylenediaminetetraacetic acid (EDTA) and ethylene glycol with corresponding molar ratios. EDTA and ethylene glycol acted as complex agents to form correct perovskite phase. 10 μl of solution was then infiltrated into NiO-YSZ anode substrate using micro-liter syringe in order to control the amount of loading. A vacuum apparatus was employed to force liquid into micro pore.

An advantage of $BaZr_mCe_nO_3$ in/on Ni-YSZ is its catalytic activity of, which effectively prevents carbon buildup and sulfur poisoning, thereby enhancing the tolerance of Ni-YSZ anode.

In another embodiment, an electrolyte layer is disposed on the Ni-YSZ composite. In another embodiment, electrolyte layer can be YSZ and can have a thickness of about 10 to 200 μm or about 30 to 100 μm.

In another embodiment, a layer of a composite of Ni and $ABO_3$ is disposed on the Ni-YSZ composite. In an embodiment, the $ABO_3$ can be $BaZr_mCe_nO_3$, where m is about 0.01 to 1 and n is about 0.01 to 1 or m is about 0.1 to 1 and n is about 0.01 to 1. The layer of composite can be disposed using techniques such as ry press, tape casting, and/or dip-coating.

In another embodiment, an electrolyte (e.g., YSZ) layer is disposed on one side of the Ni-YSZ composite while a layer of a composite of Ni and $ABO_3$ is disposed on the other side of Ni-YSZ composite. In an embodiment, the electrolyte layer and the composite can be any of these described herein.

As mentioned above, embodiments of the present disclosure include structures having an anode and a solid electrolyte disposed on at least one side of the anode. The anode is a composite selected from Ni and $ABO_3$ composite, and $ABO_3$ that has a precious metal dopant. In an embodiment, the precious metal can be any of those described herein, in particular, the precious metal can be Ru. In an embodiment, the solid electrolyte is selected from $ABO_3$; YSZ, where YSZ is yttria-stabilized zirconia; doped $CeO_2$ (e.g., doped with Gd and/or Sm), LSGM, wherein LSGM is $La_aSr_{1-a}Ga_bMg_{1-b}O_3$, where a is about 0.8 to 0.9 and b is about 0.8 to 0.9; a composite of $BaZr_mCe_nO_3(H^+)$ and $YSZ(O^{2-})$; and a composite of $BaZr_mCe_nO_3(H^+)$ and doped $CeO_2(O^{2-})$ (e.g., doped with Gd and/or Sm). The solid electrolyte layer has a thickness of about 10 to 200 μm or about 10 to 30 μm. The solid electrolyte layer can be disposed using techniques such as dry press and/or tape casting.

In each instance, $ABO_3$ can include any description of $ABO_3$ provided herein. In particular, $ABO_3$ can be $BaZr_mCe_nO_3$, where m is about 0.01 to 1 and n is about 0.01 to 1 or m is about 0.1 to 1 and n is about 0.01 to 1.

Use of $ABO_3$ as the solid electrolyte is advantageous because it has high proton conductivity and good compatibility with electrode.

Use of YSZ as the solid electrolyte is advantageous because YSZ is a commercial electrolyte which is compatible with current SOFC systems.

Use of doped $CeO_2$ as the solid electrolyte is advantageous because doped $CeO_2$ has high oxygen ion conductivity which can facilitate reforming/oxidation of carbon and sulfur.

Use of LSGM as the solid electrolyte is advantageous because it has high ionic conductivity and negligible electron conductivity.

Use of a composite of $BaZr_mCe_nO_3(H^+)$ and $YSZ(O^{2-})$ as the solid electrolyte is advantageous because the mixed conduction can be rationally designed by adjusting the ratio of two components. Also, this composite can utilize the advantages of two phases such as water adsorption ability of $BaZr_mCe_nO_3$ and oxygen transport of YSZ.

Use of a composite of $BaZr_mCe_nO_3(H^+)$ and doped $CeO_2$ $(O^{2-})$ as the solid electrolyte is advantageous because the mixed conduction can be rationally designed by adjusting the ratio of two components. Also, this composite can utilize the advantages of two phases such as water adsorption ability of $BaZr_mCe_nO_3$ and oxygen ion transport of YSZ.

In another embodiment, a cathode is disposed on the solid electrolyte. In an embodiment, the cathode is $ABO_3$ that has a transition and/or precious metal dopant. $ABO_3$ can include any description of $ABO_3$ provided herein. In particular, $ABO_3$ can be $BaZr_mCe_nO_3$, where m is about 0.01 to 1 and n is about 0.01 to 1 or m is about 0.1 to 1 and n is about 0.01 to 1. In an embodiment, the transition metal dopant can be any transition metal described herein, in particular, Co. In an embodiment, the precious metal dopant can be any transition metal described herein, in particular, Ru and/or Pd. The cathode can have a thickness of about 30 to 500 μm. The cathode can be disposed using techniques such as dry press, screen printing, and/or tape casting.

As mentioned above, embodiments of the present disclosure include a Ni-YSZ composite anode and a thin film. The thin film can be a BaO thin film or a $K_2O$ thin film. The thin film can have a thickness of about 1 to 50 nm or about 1 to 10 nm.

In an embodiment, the BaO thin film can be formed by the evaporation of BaO, $BaNO_3$, $BaCO_3$, and/or $BaZr_mCe_nO_3$. The evaporation can take place by heating BaO, $BaNO_3$, $BaCO_3$, and/or $BaZr_mCe_nO_3$ at high temperature (e.g., about 1000° C. to 500° C.).

It should be noted that during the formation of the BaO thin film, a layer of $BaZr_iY_jO_3$ can be formed between the Ni-YSZ composite anode and the thin film. The subscript i can be about 0.8 to 1 and j is about 0.01 to 0.2. The layer of $BaZr_tY_tO_3$ can have a thickness of about 1 to 50 or about 1 to 10 nm. The formed $BaZr_tY_tO_3$ can change the surface electrical and catalytic properties of YSZ and adsorb water molecules, thereby enhancing the coking and sulfur tolerance.

The $K_2O$ thin film can be formed by the evaporation of $K_2O$, $K_2NO_3$ and $K_2CO_3$ at a temperature of about 500 to 1200° C. at a pressure of about $10^{-10}$ to 1 atm.

EXAMPLES

Example 1

Brief Introduction

A barium zirconate-cerate co-doped with Y and Yb dramatically enhances the tolerance to sulfur poisoning and coking when used as a component in the anode for a solid oxide fuel cell powered by sulfur-contaminated hydrogen and propane. The anode materials that have been developed for solid oxide fuel cells (SOFCs) are vulnerable to deactivation by carbon buildup (coking) from hydrocarbon fuels or by sulfur contamination (poisoning). We report a mixed ion conductor, $BaZr_{0.1}Ce_{0.7}Y_{0.2-x}Yb_xO_{3-\delta}$, that allows rapid transport of both protons and oxide ion vacancies. It exhibits high ionic conductivity (1.3 to $6.4 \times 10^{-2}$ $\Omega^{-1}cm^{-1}$) at relatively low temperatures (500 to 700° C.). Its unique ability to resist deactivation by sulfur and coking appears linked to the mixed conductor's enhanced catalytic activity for sulfur oxidation and hydrocarbon cracking/reforming, as well as enhanced water adsorption capability.

Discussion

We report high tolerance to coking and $H_2S$ poisoning of a new material for SOFCs, a barium zirconate-cerate co-doped with Y and Yb, or $BaZr_{0.1}Ce_{0.7}Y_{0.1}Yb_{0.1}O_{3-\delta}$ (BZCYYb). This material has very high ionic conductivity below 750° C. (FIG. 2.1) which allows for fabrication of anode-supported thin-electrolyte SOFCs of high power output at lower temperatures. Second, there is no observable change in power output when the fuel is switched to one contaminated with 50 ppm $H_2S$, which we attributed to catalytic conversion of $H_2S$ to $SO_2$. Third, continuous and stable operation in dry propane for more than 100 hours without observable degradation in performance suggests that it is very effective for in situ reformation of hydrocarbons, which should help inhibit coking. Finally, it demonstrates adequate chemical and electrochemical stability over a wide range of conditions relevant to SOFC operation, implying long-term stability and long operational life. We also systematically investigated anodes consisting of Ni and BZCYYb in $H_2S$-contaminated $H_2$ and hydrocarbon fuels. They displayed not only impressive power output in clean hydrogen but also superior tolerance to coking and sulfur poisoning.

Doped zirconate-cerate compounds have been reported to exhibit both proton and oxide ion conductivity as well as a strong tendency for water absorption (or hydration) (13-17). For example, Y-doped zirconate-cerate, $Ba(Zr_{0.1}Ce_{0.7}Y_{0.2})O_{3-\delta}$ (BZCY), has high ionic conductivity and excellent chemical stability in atmospheres containing $CO_2$ and $H_2O$ under SOFC operating conditions (18). In this study, we have explored co-doping barium zirconate-cerate with Y and Yb using compositions of $BaZr_{0.1}Ce_{0.7}Y_{0.2-x}Yb_xO_{3-\delta}$ (x=0 to 0.2). We believe that the two dopants on the B-site function in a cooperative fashion to improve the ionic conductivity and the catalytic activity for reforming/oxidation of hydrocarbons as well as conversion of $H_2S$ to $SO_2$.

When we compared the conductivities of BZCYYb with those of several other SOFC electrolyte materials, namely YSZ, GDC, and BZCY (FIG. 2.1A), $BaZr_{0.1}Ce_{0.7}Y_{0.1}Yb_{0.1}O_{3-\delta}$ displayed the highest conductivity below 750° C. Operation of SOFCs at lower temperatures makes it possible to use much less expensive materials for cell components, thus reducing the cost while prolonging the operational life. As expected, the conductivities are sensitive to doping and partial pressure of oxygen, hydrogen, and water (FIGS. 2.5 and 2.6). When used as the electrolyte in an SOFC, the electronic conductivity of BZCYYb is relatively small, more so at lower temperatures (FIG. 2.7). When used as a component for the anode and exposed to hydrogen and water, however, not only the ionic defects ($OH_O^\bullet$ and $V_O^{\bullet\bullet}$) but also the electronic defects (e' and h$^\bullet$) may coexist, enhancing the catalytic activity for reforming and/or oxidation of hydrocarbons and for conversion of $H_2S$ to $SO_2$. While the conductivity of BZCYYb is about 80% better than that of BZCY (at 750° C.), the catalytic activities of BZCYYb are quite different from that of BZCY. Under open circuit conditions, for example, the cells with a Ni-BZCYYb anode show higher and more stable open cell voltages (OCVs) than the cells with a Ni-BZCY anode when exposed to wet propane at 750° C. (FIG. 2.8), an indication of much-improved ability of hydrocarbon reformation.

Typical performance of a cell based on a Ni-BZCYYb cermet anode, a BZCYYb electrolyte, and a composite cathode consisting of BZCY and LSCF (20) (FIG. 2.9) entailed peak power densities of ~1.1 W/cm² at 750° C. (FIG. 2.1B) and ~660 mW/cm² at 650° C. (FIG. 2.10) when $H_2$ and ambient air were used as fuel and oxidant, respectively. Further, when the fuel was switched to $H_2$ contaminated with 20 ppm $H_2S$, the observed power output remained about the same. Furthermore, a cell based on a Ni-BZCYYb anode and a $Sm_{0.1}Ce_{0.9}O_{2-\delta}$ (SDC) electrolyte displayed a peak power density of 564 mW/cm² at 750° C. when dry propane was used as the fuel, showing a considerably high resistance to coking and power output for an SOFC running on dry hydrocarbon. Typically, water has to be fed with a hydrocarbon fuel to prevent coking; however, addition of water will reduce the energy efficiency while increasing the complexity and cost of fuel cell systems (since it dilutes the fuel and requires a water management subsystem).

We investigated the sensitivity of this anode to sulfur poisoning by gradually increasing the concentration of $H_2S$ in hydrogen. The terminal voltages of the same cells (with BZCYYb and SDC as the electrolyte) at 750° C. were recorded as a function of time when the fuel was contaminated with different concentrations of $H_2S$ (FIG. 2.2A). The Ni-BZCYYb anodes for both cells showed no observable change in power output as the fuel was switched from clean hydrogen to hydrogen contaminated with 10, 20, or 30 ppm $H_2S$. This sulfur tolerance was also evident from our impedance data (FIGS. 2.2B and 2.2C). When water was absent from the fuel, the electrode polarization resistance increased about 80% upon exposure to 20 ppm $H_2S$, from ~0.06 ohm cm² in $H_2$ to ~0.11 ohm cm² in $H_2$ containing 20 ppm $H_2S$, as commonly observed in previous studies (21). When a small amount of water (only ~3 v %) was introduced with the fuel, the electrode polarization resistance in hydrogen with 20 ppm $H_2S$ was reduced to that in clean hydrogen, as can be interpreted from the collected impedance spectra (FIG. 2.2C). It is believed that sulfur poisoning is caused by the strong adsorption of the elemental sulfur on Ni surface and the three-phase boundaries (TPB) between Ni, electrolyte, and the fuel. Sulfur would then block the active site for fuel oxidation in a traditional Ni-YSZ anode and increase the polarization resistance (22, 23). We hypothesized that water might adsorb on the surface of BZCYYb to facilitate the oxidation of $H_2S$ or elemental sulfur to $SO_2$ at or near the active sites. Unlike $H_2S$ or elemental sulfur, $SO_2$ readily desorbs from electrode surface (24).

We note that when the fuel was switched to hydrogen containing 40 and 50 ppm $H_2S$, the cell with a BZCYYb electrolyte (a mixed proton and oxide ion conductor) suffered some drop in power output whereas the cell with an SDC electrolyte (an oxide ion conductor) displayed no observable change in performance. One possible explanation is that more water was produced at the active sites on the anode of the cell with an SDC electrolyte under active operation because of increased hydrogen oxidation; the water produced at the active sites is beneficial to sulfur removal. Continuous operation in $H_2S$-contaminated fuel for a longer period of time (200 to 1000 hours) further confirmed that sulfur poisoning can be fully suppressed in the presence of a small amount of steam (FIGS. 2.11 and 2.12).

We used Raman spectroscopy to probe for the presence of water on the surface of BZCYYb. Previous studies suggest that the characteristic OH-bond vibration modes for water appear in the 3100-3700 $cm^{-1}$ regime (25, 26). We collected Raman spectra from BZCYYb at different times of exposure to wet argon (~3 v % water) at room temperature, where incorporation of water into the bulk phase of BZCYYb is unlikely or insignificant because of limited bulk diffusion. The BZCYYb powder sample was first dried at 400° C. under evacuation for 10 hours to remove water from the sample. Upon exposure to wet (3 v % $H_2O$) argon at room temperature, the mode near 3580 $cm^{-1}$ emerged and slowly grew more intense over time. The presence of the modes in the 3100-3700 $cm^{-1}$ range, particularly that mode which peaks near 3580 $cm^{-1}$ (FIG. 2.3A), is strongly indicative of surface water molecules, as water modes at higher wave-numbers may correspond to adsorbed water with weak hydrogen bonds (27). Thus, one possible explanation for this behavior is that a layer of water accumulates at the surface quickly in a wet atmosphere, while more water builds up more slowly. These features are notably absent for the sample exposed to dry gas. Spectra collected in situ from samples held under the same gas conditions at 500° C. display similar features and contrast (FIG. 2.3B). Because most fuels (including $H_2$) are humidified at room temperature (yielding ~3 v % $H_2O$ in gas) for typical operation of SOFCs, no excess water is needed to achieve the desired tolerance to $H_2S$ contaminants.

The coking resistance of this material was demonstrated in a cell with a Ni-BZCYYb cermet anode, YSZ electrolyte, and LSCF cathode. When dry propane was used as fuel, the open circuit voltage (OCV) dropped quickly within minutes (FIG. 2.4), an indication of rapid carbon deposition as expected for a conventional Ni-based anode. In contrast, when wet (~3 v % steam) propane was used as fuel, the OCV was very stable (FIG. 2.4), suggesting that the observed tolerance to coking is also attributed to the presence of a small amount of steam. Further, the contamination of Ni surface by BZCYYb during co-firing of BZCYYb and NiO might enhance the resistance to carbon buildup (FIG. 2.13). The whole surface of the Ni-BZCYYb anode exposed to wet (~3v % $H_2O$) propane appeared clean and free of carbon deposition, as revealed using Raman spectroscopy (FIG. 2.14). The OCVs of the cell are greater than those observed for other alternative anode materials, (5, 6, 9, 28) and approach 1.00 V for wet propane. Coking may be inhibited by water reforming propane on the surface of BZCYYb and the reforming products ($H_2$ and CO) adsorb on the active sites of the anode surface, leading to a stable OCV output. We note that conventional Ni-YSZ and Ni-GDC anodes suffered severe carbon deposition under the same conditions (FIG. 2.15).

This catalytic activity of Ni-BZCYYb for in situ reforming of hydrocarbons is further demonstrated in operating cells powered by propane. A stable power output was observed for more than 100 hours (FIG. 2.16) at a current density of 300 $mA/cm^2$ for a cell with a Ni-BZCYYb anode, a YSZ electrolyte, and an LSCF cathode when wet (~3 v % steam) propane was used as fuel and air as oxidant. Analysis of the effluent gas using mass spectrometry indicated that propane was mostly converted to $C_2H_4$, $CH_4$, $H_2$, $H_2O$, $CO_2$ and CO through cracking, reformation, and electrochemical oxidation during cell operation (FIG. 2.17). In contrast, conventional Ni-YSZ anodes studied under similar conditions showed rapid degradation in performance within minutes due to severe carbon deposition.

Because steam is produced on the anode surface of an operating cell when an oxygen anion conductor (e.g., SDC) is used as the electrolyte, tolerance to coking of BZCYYb-based anodes may be further enhanced by an operating current of such a fuel cell. Indeed, when the operating current density is sufficiently high, cells based on an SDC electrolyte (FIG. 2.4) can even operate in dry propane, producing stable power output without observable degradation. Microanalysis of the anode before and after operation in dry propane for 24 hours indicates that there was no visible change in microstructure and no observable carbon deposition (FIG. 2.18). It appears that in situ reformation of hydrocarbons has prevented carbon deposition on the anode when an adequate amount of water is produced at the active sites under the operating conditions.

To examine the chemical stability, we exposed BZCYYb powder samples to $H_2$ containing 50 v % $CO_2$ or 50 v % $H_2O$ at 750° C. for 300 h and to $H_2$ containing 50 ppm $H_2S$ at 750° C. for 50 h. X-ray diffraction (XRD) analysis of the samples before and after the exposures confirmed that BZCYYb is chemically stable under these testing conditions (FIGS. 2.19 and 2.20). Raman spectra were also collected from BZCYYb powder samples under wet and dry conditions in the 100-1000 $cm^{-1}$ range in order to assess the phase stability of the material with adsorbed water, and no compositional difference was apparent between the wet and the dry samples (FIG. 2.21). Further, the Ni-BZCYYb anode is very stable under repeated electrochemical cycling: the terminal voltage of the cell was swept between OCV and 0.4 V at a rate of 10 mV/S for 1,000 cycles with no significant change in peak power density (FIG. 2.22). The remarkable ionic conductivity and stability suggest that BZCYYb is an attractive electrolyte or electrode component for low-temperature SOFCs. In addition, the material may also be used as catalysts for reforming of hydrocarbon fuels and for removal of fuel gas contaminants such as sulfur.

References for Example 1, which are incorporated herein by reference:
1. S. C. Singhal, *Solid State Ionics* 135, 305 (2000).
2. A. Atkinson et al., *Nature Mater.* 3, 17 (2004).
3. M. Flytzani-Stephanopoulos, M. Sakbodin, Z. Wang, *Science* 312, 1508 (2006).
4. E. P. Murray, T. Tsai, S. A. Barnett, *Nature* 400, 649 (1999).
5. S. D. Park, J. M. Vohs, R. J. Gorte, *Nature* 404, 265 (2000).
6. S. W. Tao, J. T. S. Irvine, *Nature Mater.* 2, 320 (2003).
7. Z. L. Zhan, S. A. Barnett, *Science* 308, 844 (2005).
8. J. C. Ruiz-Morales et al., *Nature* 439, 568 (2006).
9. Y. H. Huang, R. I. Dass, Z. L. Xing, J. B. Goodenough, *Science* 312, 254 (2006).
10. F. Z. Chen, S. W. Zha, J. Dong, M. L. Liu, *Solid State Ionics* 166, 269 (2004).
11. O. A. Marina, N. L. Canfield, J. W. Stevenson, *Solid State Ionics* 149, 21 (2002).

12. M. R. Pillai, I. Kim, D. M. Bierschenk, S. A. Barnett, *J. Power Sources.* 185, 1086 (2008).
13. K. D. Kreuer, *Ann. Rev. Mater. Res.* 33, 333 (2003).
14. K. H. Ryu, S. M. Haile, *Solid State Ionics* 125, 355 (1999).
15. Y. Yamazaki, P. Babilo, S. M. Haile, *Chem. Mater.* 20, 6352 (2008).
16. K. Katahira, Y. Kohchi, T. Shimura, H. Iwahara, *Solid State Ionics* 138, 91 (2000).
17. C. W. Tanner, A. V. Virkar, *J. Electrochem. Soc.* 143, 1386 (1996).
18. C. D. Zuo, S. W. Zha, M. L. Liu, M. Hatano, M. Uchiyama, *Adv. Mater.* 18, 3318 (2006).
19. Supporting online material (see below)
20. L. Yang, C. D. Zuo, S. Z. Wang, Z. Cheng, M. L. Liu, *Adv. Mater.* 20, 3280 (2008).
21. Z. Cheng, M. L. Liu, *Solid State Ionics* 178, 925 (2007).
22. J. B. Hansen, J. Rostrup-Nielsen, Chapter 65, in *Handbook of Fuel Cells-Fundamentals, Technology and Applications.* Eds. W. Vielstich, H. Yokokawa, H. A. Gasteiger. Vol. 6: *Advances in Electocatalysis, Materials, Diagnostics and Durability*, John Wiley & Sons, ISBN: 978-0-470-72311-1 (2009).
23. J. H. Wang, M. L. Liu, *Electrochem. Commun.* 9, 2212 (2007).
24. J. H. Wang, M. L. Liu, *J. Power Sources* 176, 23 (2008).
25. V. Crupi, D. Majolino, P. Migliardo, V. Venuti, *J. Phys. Chem. A* 104, 11000 (2000).
26. A. Anedda, C. M. Carbonaro, F. Clemente, R. Corpino, P. C. Ricci, *J. Phys. Chem. B.* 107, 13661 (2003).
27. B. Ratajska-Gadomska, W. Gadomski, *J. Chem. Phys.* 121, 12583 (2004).
28. M. Mogensen, K. Kammer, *Ann. Rev. Mater. Res.* 33, 321 (2003).
29. This research was supported by the U.S. Department of Energy Basic Energy Science Catalysis Science Program under Grant No. DE-FG02-06ER15837.

Supplemental Information for Example 1

Materials and Methods

Electrolyte and Electrode Powder Preparation

The compositions of the materials were $BaZr_{0.1}CeO_{0.7}Y_{0.2-x}Yb_xO_{3-\delta}$ (x=0, 0.05, 0.1, 0.15, 0.2). All powders were synthesized by a conventional solid state reaction method. Stoichiometric amounts of high-purity barium carbonate, zirconium oxide, cerium oxide, ytterbium oxide, and yttrium oxide powders (all from Aldrich Chemicals) were mixed by ball milling in ethanol for 48 h, followed by drying in an oven and calcination at 1100° C. in air for 10 h. The calcined powder was ball milled again, followed by another calcination at 1100° C. in air for 10 h. For the conductivity measurement, the pre-calcined powders were then isostatically pressed into a disk at 274.6 MPa. The green disks had a diameter of 10 mm, with a typical thickness of 1 mm. The disks were then sintered at 1550° C. for 10 h in air (to achieve relative density >96%). $Sm_{0.1}Ce_{0.9}O_{2-\delta}$ (SDC) powders were synthesized by a chemical co-precipitation process using corresponding metal nitrates as precursors and ammonium carbonate as the precipitation agent. After washing and drying, the resultant powders were subsequently calcined at 800° C. for 2 h. $Gd_{0.1}Ce_{0.9}O_{2-\delta}$ (GDC) and $Y_{0.15}Zr_{0.85}O_{2-\delta}$ (YSZ) were obtained from TOSOH Co., while $La_{0.6}Sr_{0.4}Co_{0.2}Fe_{0.8}O_{3-\delta}$ (LSCF) and NiO powders were obtained from Fuel Cell Materials and Sigma-Aldrich.

Fabrication of Test Cells

The button cells with a configuration of Ni-BZCYYb|BZCYYb|cathode were fabricated as follows. First, a mixture of NiO and BZCYYb powder (weight ratio of 65:35) was pressed into pellets (~0.6 mm thick and 13 mm in diameter), followed by pre-firing at 800° C. for 2 h. Second, a thin layer of BZCYYb (~10 μm) was deposited on the anode support by a solution coating process followed by co-firing at 1400° C. for 5 h. Third, a BZCY-LSCF slurry was screen printed onto the top of the BZCYYb electrolyte and fired at 1000° C. for 2 h to form a porous cathode (~30 μm thick). The Ni-BZCYYb|SDC|LSCF cells were prepared by the same method. The LSCF cathode was fired at 1050° C. for 2 h. The SDC and LSCF layer thicknesses are about 20 and 30 μm, respectively. For the Ni-BZCYYb|YSZ|LSCF cells, a YSZ disk (150 μm thick and 20 mm in diameter) was fabricated by tape casting and firing at 1450° C. for 5 h. Next, a GDC buffer layer (5 μm) was screen-painted on both sides of the YSZ and fired at 1200° C. for 2 h. Finally, NiO-BZCYYb (analogous to NiO-GDC and NiO-YSZ) anodes and LSCF cathodes were screen-painted on the GDC buffer layers, followed by firing at 1050° C. for 2 h. For the cells with a BZCYYb infiltrated Ni-YSZ anode, solution infiltration (1-5) was used to deposit a thin layer of BZCYYb on the porous Ni-YSZ, followed by calcination at 850° C. for 2 h to obtain a pure phase. The active electrode areas for all cells are 0.21 $cm^2$.

Electrochemical Testing

For conductivity studies, platinum paste was applied to both sides of electrolyte disks and fired at 900° C. for 30 min to form porous platinum electrodes. Two platinum wires were attached to each of the electrodes. The electrical conductivities were studied in dry and wet oxygen, $H_2$, argon, and 4% $H_2$ (balanced with argon) at different temperatures. The wet gases were prepared by passing the corresponding gases though a water bubbler at 25° C. to bring in ~3 v % of water vapor.

For $H_2S$ tests, each button cell was sealed on an alumina tube and heated up to 750° C. in ambient air. Since $H_2S$ can dissolve in water, a separate flow of $N_2$ was passed through a water bubbler to bring water vapor into the system. $H_2S$ concentration was adjusted by mixing $H_2$ and a certified mixture gas containing 100 ppm $H_2S$ in $H_2$ using two mass flow controllers. The flow rate was 30 mL/min. All fuel cells were first conditioned at a constant current density in clean $H_2$ to obtain steady state performance before switching to $H_2S$-contaminated $H_2$ (6-7).

For hydrocarbon testing, following reduction of anode in $H_2$, the cell was conditioned in $H_2$ as was just described, and then dry or wet $C_3H_8$ with a flow rate of 2 mL/min (passing through a water bubbler at room temperature) was fed into the cell at 750° C.

Other Characterization

X-ray diffraction with CuKα radiation (Philips, PW-1800) and Raman spectroscopy with a 514 nm excitation source (Renishaw, Raman System 2000) were used to analyze crystal structure and phase composition. Raman was also used to probe water adsorbed on sample surfaces. The microstructures of fuel cells before and after testing were revealed using a scanning electron microscope (SEM; LEO 1530) equipped with energy dispersive x-ray spectroscopy (EDS). The stability of BZCYYb powders was tested by exposing materials to $H_2$ containing 50 v % $H_2O$ (passed through a water bubbler at 85° C.) and 50 v % $CO_2$. The composition of the inlet and outlet gas mixture was monitored online by mass spectrometer (MS, Hiden HPR 20) at room temperature. All standard electrochemical experiments were performed using a Solartron 1286 electrochemical interface and a Solartron 1255 HF frequency response analyzer.

General Properties of $BaZr_{0.1}Ce_{0.7}Y_{0.2-x}Yb_xO_{3-\delta}$ (x=0–0.2)

FIG. 2.5 shows XRD patterns of various Yb-doped $BaZr_{0.1}Ce_{0.7}Y_{0.2}O_{3-\delta}$. A pattern for a pure perovskite resembling that of $BaCeO_3$ can be observed. It is clear that Yb has replaced Y and has been doped into the lattice of $BaZr_{0.1}Ce_{0.7}Y_{0.2}O_{3-\delta}$ properly. Furthermore, XRD patterns of the materials did not change after conductivity measurements in dry and wet argon, oxygen, and hydrogen, suggesting that the samples are quite stable over a wide range of oxygen partial pressures.

FIG. 2.6 shows the conductivities of $BaZr_{0.1}Ce_{0.7}Y_{0.2-x}Yb_xO_{3-\delta}$ (x=0–0.2) in wet oxygen. The conductivities measured at different temperatures seem to have similar dependence on Yb concentration. The conductivities increase quickly with increasing Yb concentration, reaching a maximum at ~10%. With any further increase in the concentration of Yb dopant, the conductivities decreased slightly. However, the conductivities in $BaZr_{0.1}Ce_{0.7}Yb_{0.2}O_{3-\delta}$ are still higher than those in $BaZr_{0.1}Ce_{0.7}Y_{0.2}O_{3-\delta}$. It is interesting to see that the barium zirconate-cerate solid solution containing multiple dopants has a higher conductivity than one containing a single dopant, which could herald a new method for the design of high-conductivity proton conductors.

FIG. 2.7 shows the open circuit voltages, together with the Nernst potentials, for a cell based on a BZCYYb electrolyte membrane at different temperatures with wet $H_2$ (~3 v % $H_2O$) as fuel and air as oxidant. The electronic transference number varies from ~0.02 at 500° C. to ~0.1 at 750° C., suggesting that the electronic conduction is relatively insignificant at low temperatures.

FIG. 2.8 shows the open cell voltages (OCVs) of two cells with different anodes: Ni-BZCYYb and Ni-BZCY. The cell with a Ni-BZCYYb anode displayed higher and more stable OCVs than the cell with a Ni-BZCY anode, suggesting that BZCYYb has much-improved ability for hydrocarbon reformation.

FIG. 2.9 shows the morphologies of a typical Ni-BZCYYb|BZCYYb|BZCY-LSCF cell as fabricated (before NiO was reduced to Ni). The BZCYYb electrolyte is ~10 μm thick and adhered well to the anode support, indicating that our solution coating method can produce a thin and dense BZCYYb electrolyte that requires a relatively low sintering temperature. The average grain size is relatively large (~15 μm), which could effectively reduce grain boundary resistance.

FIG. 2.10 shows the current-voltage characteristics and the corresponding power density for a fuel cell based on a Ni-BZCYYb anode, a BZCYYb electrolyte, and a BZCY-LSCF composite cathode at 650° C., demonstrating a peak power density is ~660 mW/cm². Stability of Ni-BZCYYb anodes in $H_2S$-contaminated $H_2$ and $C_3H_8$ FIG. 2.11 shows the performance of a cell with a configuration of BZCYYb/Ni-YSZ|YSZ|LSCF operated in wet hydrogen contaminated with 10 ppm $H_2S$. The Ni-YSZ anode was coated with a thin layer of BZCYYb using a solution infiltration process. This cell demonstrated that the state-of-the-art fuel cells based on YSZ, Ni-YSZ|YSZ|LSCF, can be readily modified by a thin film coating of BZCYYb to enhance the tolerance to sulfur poisoning. Further, the cell showed a stable power output for 1000 h, implying that BZCYYb exhibits considerable stability for long-term sulfur tolerance.

FIG. 2.12 shows the performance of a Ni-BZCYYb|SDC|LSCF cell operated at a constant current density of 700 mA/cm² at 750° C. when the fuel was switched from wet hydrogen to wet hydrogen contaminated with 30 ppm $H_2S$, indicating that sulfur poisoning can be fully suppressed in the presence of a small amount of water. After the 200 h operation, the Ni-BZCYYb anode surface was examined by EDS under SEM, but there was no sulfur detected.

We used electron microscopy and Raman spectroscopy to determine if carbon had deposited in the anode structure after exposure to dry and wet propane under open circuit conditions, the most severe conditions for carbon deposition (since the operation of the cell will produce water and $CO_2$ at the anode, thus increasing the steam to carbon ratio and the probability of reformation). If coking is absent at OCV, it would be less likely to occur during cell operation. FIG. 2.13 shows a typical morphology of Ni-BZCYYb anode and EDS spectrum collected from a Ni area, suggesting that Ba is present in the Ni area. Apparently, the Ni grains had been contaminated by BZCYYb. XPS analysis of the surface of Ni grains also confirms that Ba was present on the surface. The contamination of Ni surface by BZCYYb most likely happened during the co-firing of BZCYYb and NiO (at 1400° C. for 5 hours). In all likelihood, the spreading of elements from BZCYYb to the surface of NiO grains during co-firing resulted in a surface that has enhanced resistance to coking. While it is certain that the Ni surface became contaminated by BZCYYb, the detailed structure of this contaminated Ni surface is still unknown. In situ surface analysis techniques must be used to characterize the surface composition and structure under SOFC operating conditions because ex situ surface characterization may not be reliable; the surface composition and structure may change as a functional cell is cooled down (from 750° C. in the fuel to room temperature in air) to prepare samples for ex situ analysis such as electron microscopy and spectroscopy in vacuum.

Since Raman is very sensitive to trace amounts of carbon (which may not be observable under SEM examination), we used Raman spectroscopy to probe and map the presence of any carbon on a large area of an anode surface after exposure to propane. FIG. 2.14 shows some typical Raman spectra collected from Ni-BZCYYb anodes after exposure to wet and dry propane under open circuit conditions. While the disordered and graphitic carbon peaks (near 1340 $cm^{-1}$ and 1580 $cm^{-1}$, respectively) (8) were readily observable from the anode exposed to dry propane (FIG. 2.14A), they were largely absent from the spectra collected from the same anode surface after exposure to wet (~3 v % $H_2O$) propane (FIG. 2.14B). Out of 100 spectra collected from 100 points uniformly distributed in a rectangular mesh covering an area of 80 μm×60 μm, only 42 spectra show a trace amount of carbon, and are comparable to FIG. 2.14C, an indication of minimal carbon deposition.

FIG. 2.15 shows that the OCVs of a cell with a Ni-GDC anode and YSZ electrolyte decreased rapidly upon exposure to wet (3 v % water) propane, while the OCVs of a cell with a Ni-BZCYYb anode was very stable under the same conditions, an indication of remarkable tolerance to coking of BZCYYb over GDC. The strong adsorption of water on the surface of BZCYYb, the TPB, and the contaminated Ni surface may dramatically change the local composition of the fuel in equilibrium with these surface sites on the anode. While the average steam to carbon ratio (S/C) for the incoming wet (~3v % $H_2O$) propane in the gas phase is about 1 to 97, this ratio could be much greater on the anode surface because of the strong adsorption of water, possibly approaching the needed S/C ratio to avoid coking (about 1:1) under open circuit conditions.

FIG. 2.16 shows open circuit voltages and power output at a constant current density of 300 mA/cm$^2$ for a cell with a configuration of Ni-BZCYYb|YSZ|LSCF when wet (~3 v % steam) propane was used as fuel and air as oxidant. It demonstrated stable OCV and sustained power output for over 100 h when wet propane was used as fuel. The outlet gas from this cell under steady state operation was analyzed using mass spectrometry, as shown in FIG. 2.17. Due to the instrumental limitations, it is not possible to determine the relative contributions of the fragments [CO]$^+$ and [C$_2$H$_4$]$^+$ to the mass signal at m/z=28. However, our analysis of oxygen mass balance suggests that the ratio of CO to C$_2$H$_4$ is relative small. At an operating current of 63 mA (=0.21 cm$^2$×300 mA/cm$^2$), the oxygen flux going through the electrolyte to the anode was ~3.21×10$^{-7}$ mol/s or 0.431 mL/min. Since the concentrations of H$_2$O and CO$_2$ in the outlet gas mixture were 3.58 v % and 2.34 v %, respectively, the concentration of CO in the outlet gas should be ~2.65 v %, considering that ~3 v % of water was fed with propane in the inlet gas. Analysis of carbon mass balance suggests that the mass of carbon for the inlet gas is slightly larger than that for the outlet gas. This is reasonable since small amount of carbon deposits were observed on the gas feeding tube walls after operation. It appears that a large fraction of C$_3$H$_8$ was converted to C$_2$H$_4$ and CH$_4$, but the details about cracking, reformation, and electrochemical oxidation during fuel cell operation are still unknown. However, it is certain that the in situ reforming and electrochemical oxidation are sufficiently fast to avoid carbon buildup at the anode.

FIG. 2.18 shows the morphologies of a Ni-BZCYYb|SDC|LSCF cell before and after operation in dry propane at a constant current density of 600 mA/cm$^2$ for 24 hours. It is seen that the Ni-BZCYYb anode exhibit fine uniform microstructures and that no carbon deposits blocked the pores. Further, the anode adheres well to the electrolyte. Chemical and Electrochemical Stability of BZCYYb in H$_2$O, CO$_2$, and H$_2$S FIG. 2.19 shows XRD patterns of BZCYYb powders before and after exposure to H$_2$ with 50 vol % CO$_2$ and H$_2$ with 50% H$_2$O at 750° C. for 300 h. Contrary to decomposition that is normally seen in doped BaCeO$_3$, it can be observed that the structure of BZCYYb is stable in an atmosphere containing H$_2$O or CO$_2$. The partial substitution of Ce by Zr did indeed increase the chemical stability of this material (9-11). Additionally, Y and Yb are further shown as stable dopants for cerate system (12).

FIG. 2.20 indicates XRD patterns of BZCYYb powders before and after exposure to 50 ppm H$_2$S-contaminated H$_2$. It was shown that no chemical reactions occur between BZCYYb and H$_2$S at 50 ppm.

FIG. 2.21 shows a characteristic Raman spectrum for BZCYYb, which is similar to that of BaCeO$_3$. The most intense signals, which are found in the 275-350 cm$^{-1}$ range, are produced by Ce—O stretching in the structure (13). The Ce—O vibrations are generally observed in the 300-375 cm$^{-1}$ range for BaCeO$_3$ spectra. Thus, the shift in the Ce—O range in the BZCYYb spectrum is most likely an effect of the dopants in BZCYYb. No difference in composition is observable between wet and dry BZCYYb, so the bulk phase remains unchanged between these conditions.

To evaluate the electrochemical stability of Ni-BZCYYb anode, we first ran the cells for repeated power cycles from open circuit voltage (OCV) to 0.4 V and back to OCV. The potential sweeping rate was 10 mV/s. The Ni-BZCYYb anode is electrochemically stable under the testing conditions, as demonstrated by the cycling data shown in FIG. 2.22.

References for supplemental section of Example 1, each of which are incorporated herein by reference S1. T. Z. Sholklapper, H. Kurokawa, C. P. Jacobson, S. J. Visco, L. C. De Jonghe, *Nano Lett.* 7, 2136 (2007)
S2. J. M. Vohs, R. J. Gorte, *Adv. Mater.* 21, 943 (2009)
S3. S. P. Jiang, *Mater. Sci. Eng. A-Struct.* 418, 199 (2006)
S4. M. Shah, J. D. Nicholas, S. A. Barnett, *Electrochem. Commun.* 11, 2 (2009)
S5. C. Torres-Garibay, D. Kovar, A. Manthiram, *J. Power Sources* 187, 480 (2009).
S6. Y. Matsuzaki, I. Yasuda, *Solid State Ionics* 132, 261 (2000).
S7. M. Y. Gong, X. B. Liu, J. Tremblay, C. Johnson, *J. Power Sources* 168, 289 (2007).
S8. M. Pomfret, J. C. Owrutsky, R. Walker, *Anal. Chem.* 79, 2367 (2007)
S9. K. H. Ryu, S. M. Haile, *Solid State Ionics* 125, 355 (1999).
S10. S. Wienstroer, H. D. Wiemhofer, *Solid State Ionics* 101, 1113 (1997).
S11 C. D. Savaniu, J. Canales-Vazquez, J. T. S. Irvine, *J. Mater. Chem.* 15, 598 (2005)
S12H. Matsumoto, Y. Kawasaki, N. Ito, M. Enoki, T. Ishihara, Electrochem. Solid-State Lett. 10, B77 (2007)
S13. T. Scherban, R. Villeneuve, L. Abello, G. Lucazeau, *J. Raman Spectrosc.* 24, 805 (1993).

Example 2

FIG. 3.1 shows a comparison of the ionic conductivity as a function of temperature for B9K1ZCY7 and BZCY7 electrolyte materials. We developed a mixed proton and oxygen-ion conductor (Ba$_{0.9}$K$_{0.1}$)(Ce$_{0.7}$Zr$_{0.1}$Y$_{0.2}$)O$_{3-\delta}$ (B9K1ZCY7) in which Ba is doped by K in A-site and Ce is doped by Y in B site without crushing the structure of the perovskite due to similar ionic radius between the Ba$^{2+}$ and K$^{1+}$ (Ba$^{2+}$—1.36 Å, K$^{1+}$—1.33 Å). This A-site and B-site doped conductor exhibited high ionic conductivities. As shown in FIG. 3.1, the total ionic conductivities of B9K1ZCY7 is higher than only B-site doped conductor (BZCY7) in the whole temperature range (from about 300° C. to 700° C.), especially at the high temperatures.

Example 3

Modification of Ni-YSZ by BZCYYb

FIG. 4.1A represents the schematic structure of cells with modified Ni-YSZ anodes. Both inner infiltrated BZCYYb and outer Ni-BZCYYb catalyst layer are utilized to prevent the sulfur poisoning and coking of Ni-YSZ simultaneously. FIG. 4.1B is the cross-sectional morphology of a typical full cell. All anode, electrolyte, buffer and cathode layers are well-adhered. FIG. 4.1C represents the interface between Ni-YSZ and Ni-BZCYYb. The compatible thermal expansion coefficient leads to formation of a mechanically strong bond between two layers. Further, BZCYYb nanoparticles are found to be uniformly distributed in the porous Ni-YSZ anodes shown in FIG. 4.1D.

The double effects of inner and outer coatings can effectively eliminate sulfur poisoning due to low concentration of sulfur. After reforming by outer catalyst layer, the residue hydrocarbon in Ni-YSZ might be further catalyzed by BZCYYb nanoparticles before its decomposition. The infiltrated catalyst is capable of inhibition of sulfur and carbon poisoning at this low concentration. Thus, the OCV of cell with two modifications in propane is as high as 1.03 V, indicating nearly full reforming of equilibrated propane. FIG. 4.2 shows current-voltage characteristics and power density of the cells with and without modification of Ni-YSZ anode before/after exposure to 10 ppm $H_2S$ and propane at 750° C. It is easily seen that no obvious performance degradation of BZCYYb modified Ni-YSZ anode was observed in $H_2S$ comparing it in $H_2$, indicating enhanced sulfur tolerance. BZCYYb modified Ni-YSZ anode shows impressive catalytic activity toward propane reforming/oxidation. The OCV is as high as 1.03 V and the peak powder density is impressive, reaching a value of about 560 mW/cm$^2$ at 750° C.

Example 4

Modification of Ni-YSZ by BaO

One of the unique advantages of SOFCs over other types of fuel cells is the fuel flexibility. SOFCs have the potential of direct utilization of hydrocarbon fuels. Compared with pure hydrogen, hydrocarbon fuels have higher energy density and are readily available and easier to transport and store based on current infrastructure. To use them, hydrocarbon fuels are reformed externally or internally into CO and $H_2$ on catalysts such as nickel. Traditional Ni-yttria-stabilized-zirconia (YSZ) is highly susceptible to coking when operated at high temperatures. To overcome these problems, significant efforts have been devoted to the development of new anode materials and novel electrode structures. However, all of these achievements are either incompatible with current SOFC system or too expensive to be practically commercialized. Thus, it is necessary to explore a simple and cheap modification of state-of-the-art Ni-YSZ anode while achieving excellent coking tolerance. Here we reported evaporation deposition of BaO thin film on Ni-YSZ anode which demonstrated stable power output in dry propane.

FIGS. 5.1A and FIG. 5.1B show the current-voltage characteristics and the corresponding power densities at 800° C. and 750° C., respectively, in $H_2$ for YSZ based anode-supported fuel cells with/without BaO thin film. Obviously, Ni-YSZ with modification of BaO film at 1250° C. produced highest power densities throughout the testing temperatures. In contrast, the cell with BaO film at 900° C. decreased the power output. This is due probably to the blockage of electron transport resulting from insulating BaO. From the impedance spectroscopy measurements, it was found that the ohmic resistance of this cell was increased after using BaO treated at 900° C. However, when the annealing temperature was increased to 1250° C., the excess BaO evaporated and film become so thin that electron tunneling occurs. The other possibility is the formation of $BaZr_xY_{1-x}O_3$ on the YSZ surface, which might facilitation of $H_2$ dissociation.

FIG. 5.2 shows the current density of a typical cell with BaO modified Ni-YSZ anode as function of time in wet and dry propane at 750° C. This indicates that stable power output in propane can be obtained after introduction of BaO thin film. However, Ni-YSZ anode without BaO suffered severe degradation in performance within minutes as a result of severe carbon deposition.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, or ±10%, of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

Therefore, the following is claimed:

1. A structure, comprising:
    a Ni-YSZ composite anode and a thin film selected from the group consisting of: a BaO thin film and a $K_2O$ thin film.

2. The structure of claim 1, wherein the thin film is BaO.

3. The structure of claim 1, further comprising a layer of $BaZr_iY_jO_3$ between the Ni-YSZ composite anode and the thin film, wherein i is about 0.8 to 1 and j is about 0.01 to 0.2.

* * * * *

UNITED STATES PATENT AND TRADEMARK OFFICE
CERTIFICATE OF CORRECTION

PATENT NO. : 8,932,781 B2
APPLICATION NO. : 12/609179
DATED : January 13, 2015
INVENTOR(S) : Yang et al.

It is certified that error appears in the above-identified patent and that said Letters Patent is hereby corrected as shown below:

In the Specification

The parentheses surrounding the phrase "The spectrum also shows Au, which is from....during SEM analysis" in Col. 3, lines 52-54, should be deleted.

Col. 9, line 13, the "." following Ce(NO3)3 and preceeding 6H2O should be removed.

Col. 9, line 15, the "." following Zr1 and preceeding xCex should be removed.

Col. 9, line 35, should be corrected to $BaCo_3$, $CeO_2$, and $ZrO_2$... instead of BaCo3, CeO2, ZrO2.

Col. 11, line 35, a "," after (FIG. 2.1) should be added.

Col. 21, line 38, a "." after H2S should be added.

Signed and Sealed this
Twenty-fifth Day of August, 2015

Michelle K. Lee
*Director of the United States Patent and Trademark Office*